United States Patent
Huber et al.

(10) Patent No.: US 9,982,884 B2
(45) Date of Patent: May 29, 2018

(54) METHODS OF MELTING FEEDSTOCK USING A SUBMERGED COMBUSTION MELTER

(71) Applicant: JOHNS MANVILLE, Denver, CO (US)

(72) Inventors: Aaron Morgan Huber, Castle Rock, CO (US); Albert Patrick Faulkinbury, Highlands Ranch, CO (US)

(73) Assignee: Johns Manville, Denver, CO (US)

( * ) Notice: Subject to any disclaimer, the term of this patent is extended or adjusted under 35 U.S.C. 154(b) by 232 days.

(21) Appl. No.: 14/854,271

(22) Filed: Sep. 15, 2015

(65) Prior Publication Data
US 2017/0074506 A1    Mar. 16, 2017

(51) Int. Cl.
| C03B 5/235 | (2006.01) |
| F23C 3/00 | (2006.01) |
| F27B 3/20 | (2006.01) |
| F27B 3/22 | (2006.01) |
| F27B 1/08 | (2006.01) |
| F23D 14/22 | (2006.01) |

(52) U.S. Cl.
CPC ............ *F23C 3/004* (2013.01); *C03B 5/2356* (2013.01); *F23D 14/22* (2013.01); *F27B 1/08* (2013.01); *F27B 3/205* (2013.01); *F27B 3/225* (2013.01)

(58) Field of Classification Search
CPC .................................................. C03B 5/2356
See application file for complete search history.

(56) References Cited

U.S. PATENT DOCUMENTS

| 1,579,353 A | 4/1926 | Good |
| 1,636,151 A | 7/1927 | Schofield |
| 1,679,295 A | 7/1928 | Dodge |
| 1,706,857 A | 3/1929 | Mathe |
| 1,716,433 A | 6/1929 | Ellis |
| 1,875,474 A | 9/1932 | McKinley |
| 1,883,023 A | 10/1932 | Slick |

(Continued)

FOREIGN PATENT DOCUMENTS

| DE | 40 00 358 C2 | 3/1993 |
| DE | 196 19 919 A1 | 8/1997 |

(Continued)

OTHER PUBLICATIONS

SU425853A2—Google Machine Translations performed Aug. 2017.*

(Continued)

*Primary Examiner* — Lisa L Herring
(74) *Attorney, Agent, or Firm* — Robert D. Touslee

(57) ABSTRACT

Methods of maximizing mixing and melting in a submerged combustion melter (SCM) are described. One method includes melting an inorganic feedstock in an SCM using an arrangement of two or more submerged combustion (SC) burners, the SCM having a length (L) and a width (W), a centerline (C), a north side (N) and a south side (S), and operating the arrangement of SC burners such that a progressively higher percentage of a total combustion flow from the SC burners occurs from SC burners at progressively downstream positions in the SCM. Other methods include operating the N and S SC burners with more combustion flow than the central burners. Other methods include strategic placement of fuel lean SC burners and fuel rich SC burners.

3 Claims, 8 Drawing Sheets

(56) References Cited

U.S. PATENT DOCUMENTS

| | | |
|---|---|---|
| 1,937,321 A | 11/1933 | Howard |
| 1,944,855 A | 1/1934 | Wadman |
| 1,989,103 A | 1/1935 | McKelvey et al. |
| 2,042,560 A | 6/1936 | Stewart |
| 2,064,546 A | 12/1936 | Kutchka |
| 2,174,533 A | 10/1939 | See et al. |
| 2,118,479 A | 1/1940 | McCaskey |
| 2,269,459 A | 1/1942 | Kleist |
| 2,432,942 A | 12/1947 | See et al. |
| 2,455,907 A | 1/1948 | Slayter |
| 2,658,094 A | 11/1953 | Nonken |
| 2,677,003 A | 5/1954 | Arbeit et al. |
| 2,679,749 A | 6/1954 | Poole |
| 2,691,689 A | 10/1954 | Arbeit et al. |
| 2,718,096 A | 9/1955 | Henry et al. |
| 2,773,545 A | 12/1956 | Petersen |
| 2,781,756 A | 2/1957 | Kobe |
| 2,867,972 A | 1/1959 | Holderreed et al. |
| 2,878,644 A | 3/1959 | Fenn |
| 2,890,166 A | 6/1959 | Heinze |
| 2,902,029 A | 9/1959 | Hill |
| 2,981,250 A | 4/1961 | Stewart |
| 2,072,683 A | 1/1962 | Switzer et al. |
| 3,020,165 A | 2/1962 | Davis |
| 3,056,283 A | 10/1962 | Tiede |
| 3,084,392 A | 4/1963 | Labino |
| 3,088,812 A | 5/1963 | Bitterlich et al. |
| 3,104,947 A | 9/1963 | Switzer et al. |
| 3,129,087 A | 4/1964 | Hagy |
| 3,160,587 A | 12/1964 | Saxton et al. |
| 3,165,452 A | 1/1965 | Williams |
| 3,170,781 A | 2/1965 | Keefer |
| 3,174,820 A | 3/1965 | See et al. |
| 3,215,189 A | 11/1965 | Bauer |
| 3,224,855 A | 12/1965 | Plumat |
| 3,226,220 A | 12/1965 | Plumat |
| 3,237,929 A | 3/1966 | Plumat et al. |
| 3,239,325 A | 3/1966 | Roberson et al. |
| 3,241,548 A | 3/1966 | See et al. |
| 3,245,769 A | 4/1966 | Eck et al. |
| 3,248,205 A | 4/1966 | Dolf et al. |
| 3,248,206 A | 4/1966 | Apple et al. |
| 3,260,587 A | 7/1966 | Dolf et al. |
| 3,268,313 A | 8/1966 | Burgman et al. |
| 3,285,834 A | 11/1966 | Guerrieri et al. |
| 3,294,512 A | 12/1966 | Penberthy |
| 3,325,298 A | 6/1967 | Brown |
| 3,375,095 A | 3/1968 | Poole |
| 3,380,463 A | 4/1968 | Trethewey |
| 3,385,686 A | 5/1968 | Plumat et al. |
| 3,402,025 A | 9/1968 | Garrett et al. |
| 3,407,805 A | 10/1968 | Bougard |
| 3,407,862 A | 10/1968 | Mustian, Jr. |
| 3,420,510 A | 1/1969 | Griem |
| 3,421,873 A | 1/1969 | Burgman et al. |
| 3,421,876 A | 1/1969 | Schmidt |
| 3,432,399 A | 3/1969 | Schutt |
| 3,442,633 A | 5/1969 | Perry |
| 3,445,214 A | 5/1969 | Oremesher |
| 3,498,779 A | 3/1970 | Hathaway |
| 3,510,393 A | 5/1970 | Burgman et al. |
| 3,519,412 A | 7/1970 | Olink |
| 3,525,674 A | 8/1970 | Barnebey |
| 3,533,770 A | 10/1970 | Adler et al. |
| 3,547,611 A | 12/1970 | Williams |
| 3,563,683 A | 2/1971 | Hess |
| 3,573,016 A | 3/1971 | Rees |
| 3,592,151 A | 7/1971 | Webber |
| 3,592,623 A | 7/1971 | Shepherd |
| 3,600,149 A | 8/1971 | Chen et al. |
| 3,606,825 A | 9/1971 | Johnson |
| 3,617,234 A | 11/1971 | Hawkins et al. |
| 3,627,504 A | 12/1971 | Johnson et al. |
| 3,632,335 A | 1/1972 | Worner |
| 3,692,017 A | 9/1972 | Glachant et al. |
| 3,717,139 A | 2/1973 | Guillet et al. |
| 3,738,792 A | 6/1973 | Feng |
| 3,741,656 A | 6/1973 | Shapiro |
| 3,741,742 A | 6/1973 | Jennings |
| 3,746,527 A | 7/1973 | Knavish et al. |
| 3,747,588 A | 7/1973 | Malmin |
| 3,754,879 A | 8/1973 | Phaneuf |
| 3,756,800 A | 9/1973 | Phaneuf |
| 3,763,915 A | 10/1973 | Perry et al. |
| 3,764,287 A | 10/1973 | Brocious |
| 3,771,988 A | 11/1973 | Starr |
| 3,788,832 A | 1/1974 | Nesbitt |
| 3,818,893 A | 6/1974 | Kataoka et al. |
| 3,835,909 A | 9/1974 | Douglas et al. |
| 3,840,002 A | 10/1974 | Douglas et al. |
| 3,856,496 A | 12/1974 | Nesbitt et al. |
| 3,885,945 A | 5/1975 | Rees et al. |
| 3,907,585 A | 9/1975 | Francel et al. |
| 3,913,560 A | 10/1975 | Lazarre et al. |
| 3,929,445 A | 12/1975 | Zippe |
| 3,936,290 A | 2/1976 | Cerutti et al. |
| 3,951,635 A | 4/1976 | Rough |
| 3,976,464 A | 8/1976 | Wardlaw |
| 4,001,001 A | 1/1977 | Knavish et al. |
| 4,004,903 A | 1/1977 | Daman et al. |
| 4,028,083 A | 6/1977 | Patznick et al. |
| 4,083,711 A | 4/1978 | Jensen |
| 4,101,304 A | 7/1978 | Marchand |
| 4,110,098 A | 8/1978 | Mattmuller |
| 4,153,438 A | 5/1979 | Stream |
| 4,185,982 A | 1/1980 | Schwenninger |
| 4,203,761 A | 5/1980 | Rose |
| 4,205,966 A | 6/1980 | Horikawa |
| 4,208,201 A | 6/1980 | Rueck |
| 4,226,564 A | 10/1980 | Takahashi et al. |
| 4,238,226 A | 12/1980 | Sanzenbacher et al. |
| 4,249,927 A | 2/1981 | Fukuzaki et al. |
| 4,270,740 A | 6/1981 | Sanzenbacher et al. |
| 4,282,023 A | 8/1981 | Hammel et al. |
| 4,303,435 A | 12/1981 | Sleighter |
| 4,309,204 A | 1/1982 | Brooks |
| 4,316,734 A | 2/1982 | Spinosa et al. |
| 4,323,718 A | 4/1982 | Buhring et al. |
| 4,349,376 A | 9/1982 | Dunn et al. |
| 4,360,373 A | 11/1982 | Pecoraro |
| 4,397,692 A | 8/1983 | Ramge et al. |
| 4,398,925 A | 8/1983 | Trinh et al. |
| 4,405,351 A | 9/1983 | Sheinkop |
| 4,406,683 A | 9/1983 | Demarest |
| 4,413,882 A | 11/1983 | Bailey et al. |
| 4,424,071 A | 1/1984 | Steitz et al. |
| 4,432,780 A | 2/1984 | Propster et al. |
| 4,455,762 A | 6/1984 | Saeman |
| 4,461,576 A | 7/1984 | King |
| 4,488,537 A | 12/1984 | Laurent |
| 4,508,970 A | 4/1985 | Ackerman |
| 4,539,034 A | 9/1985 | Hanneken |
| 4,542,106 A | 9/1985 | Sproull |
| 4,545,800 A | 10/1985 | Won et al. |
| 4,549,896 A | 10/1985 | Streicher et al. |
| 4,599,100 A | 7/1986 | Demarest |
| 4,622,007 A | 11/1986 | Gitman |
| 4,626,199 A | 12/1986 | Bounini |
| 4,632,687 A | 12/1986 | Kunkle et al. |
| 4,634,461 A | 1/1987 | Demarest, Jr. et al. |
| 4,657,586 A | 4/1987 | Masterson et al. |
| 4,718,931 A | 1/1988 | Boettner |
| 4,723,708 A | 2/1988 | Berger et al. |
| 4,735,642 A | 4/1988 | Jensen et al. |
| 4,738,938 A | 4/1988 | Kunkle et al. |
| 4,758,259 A | 7/1988 | Jensen |
| 4,794,860 A | 1/1989 | Welton |
| 4,798,616 A | 1/1989 | Knavish et al. |
| 4,812,372 A | 3/1989 | Kithany |
| 4,814,387 A | 3/1989 | Donat |
| 4,816,056 A | 3/1989 | Tsai et al. |
| 4,818,265 A | 4/1989 | Krumwiede et al. |
| 4,877,436 A | 10/1989 | Sheinkop |
| 4,877,449 A | 10/1989 | Khinkis |

(56) References Cited

U.S. PATENT DOCUMENTS

| | | |
|---|---|---|
| 4,878,829 A | 11/1989 | Anderson |
| 4,882,736 A | 11/1989 | Pieper |
| 4,886,539 A | 12/1989 | Gerutti et al. |
| 4,900,337 A | 2/1990 | Zortea et al. |
| 4,919,700 A | 4/1990 | Pecoraro et al. |
| 4,927,886 A | 5/1990 | Backderf et al. |
| 4,932,035 A | 6/1990 | Pieper |
| 4,953,376 A | 9/1990 | Merlone |
| 4,963,731 A | 10/1990 | King |
| 4,969,942 A | 11/1990 | Schwenninger et al. |
| 4,973,346 A | 11/1990 | Kobayashi et al. |
| 5,011,086 A | 4/1991 | Sonnleitner et al. |
| 5,032,230 A | 7/1991 | Shepherd |
| 5,052,874 A | 10/1991 | Johanson |
| 5,062,789 A | 11/1991 | Gitman |
| 5,097,802 A | 3/1992 | Clawson |
| 5,168,109 A | 12/1992 | Backderf et al. |
| 5,169,424 A | 12/1992 | Grinnen et al. |
| 5,194,747 A | 3/1993 | Culpepper et al. |
| 5,199,866 A | 4/1993 | Joshi et al. |
| 5,204,082 A | 4/1993 | Schendel |
| 5,299,929 A | 4/1994 | Yap |
| 5,360,171 A | 11/1994 | Yap |
| 5,374,595 A | 12/1994 | Dumbaugh et al. |
| 5,405,082 A | 4/1995 | Brown et al. |
| 5,412,882 A | 5/1995 | Zippe et al. |
| 5,449,286 A | 9/1995 | Snyder et al. |
| 5,473,885 A | 12/1995 | Hunter, Jr. et al. |
| 5,483,548 A | 1/1996 | Coble |
| 5,490,775 A | 2/1996 | Joshi et al. |
| 5,522,721 A | 6/1996 | Drogue et al. |
| 5,545,031 A | 8/1996 | Joshi et al. |
| 5,575,637 A | 11/1996 | Slavejkov et al. |
| 5,586,999 A | 12/1996 | Kobayashi |
| 5,595,703 A | 1/1997 | Swaelens et al. |
| 5,606,965 A | 3/1997 | Panz et al. |
| 5,613,994 A | 3/1997 | Muniz et al. |
| 5,615,668 A | 4/1997 | Panz et al. |
| 5,636,623 A | 6/1997 | Panz et al. |
| 5,672,827 A | 9/1997 | Jursich |
| 5,713,668 A | 2/1998 | Lunghofer et al. |
| 5,718,741 A | 2/1998 | Hull et al. |
| 5,724,901 A | 3/1998 | Guy et al. |
| 5,736,476 A | 4/1998 | Watzke et al. |
| 5,743,723 A | 4/1998 | Iatrides et al. |
| 5,765,964 A | 6/1998 | Calcote et al. |
| 5,814,121 A | 9/1998 | Travis |
| 5,829,962 A | 11/1998 | Drasek et al. |
| 5,833,447 A | 11/1998 | Bodelin et al. |
| 5,849,058 A | 12/1998 | Takeshita et al. |
| 5,863,195 A | 1/1999 | Feldermann |
| 5,887,978 A | 3/1999 | Lunghofer et al. |
| 5,944,507 A | 8/1999 | Feldermann |
| 5,944,864 A | 8/1999 | Hull et al. |
| 5,954,498 A | 9/1999 | Joshi et al. |
| 5,975,886 A | 11/1999 | Phillippe |
| 5,979,191 A | 11/1999 | Jian |
| 5,984,667 A | 11/1999 | Phillippe et al. |
| 5,993,203 A | 11/1999 | Koppang |
| 6,029,910 A | 2/2000 | Joshi et al. |
| 6,036,480 A | 3/2000 | Hughes et al. |
| 6,039,787 A | 3/2000 | Edlinger |
| 6,044,667 A | 4/2000 | Chenoweth |
| 6,045,353 A | 4/2000 | VonDrasek et al. |
| 6,068,468 A | 5/2000 | Phillipe et al. |
| 6,071,116 A | 6/2000 | Phillipe et al. |
| 6,074,197 A | 6/2000 | Phillippe |
| 6,077,072 A | 6/2000 | Marin et al. |
| 6,085,551 A | 7/2000 | Pieper et al. |
| 6,109,062 A | 8/2000 | Richards |
| 6,113,389 A | 9/2000 | Joshi et al. |
| 6,116,896 A | 9/2000 | Joshi et al. |
| 6,120,889 A | 9/2000 | Turner et al. |
| 6,123,542 A | 9/2000 | Joshi et al. |
| 6,126,438 A | 10/2000 | Joshi et al. |
| 6,154,481 A | 11/2000 | Sorg et al. |
| 6,156,285 A | 12/2000 | Adams et al. |
| 6,171,100 B1 | 1/2001 | Joshi et al. |
| 6,178,777 B1 | 1/2001 | Chenoweth |
| 6,183,848 B1 | 2/2001 | Turner et al. |
| 6,210,151 B1 | 4/2001 | Joshi et al. |
| 6,210,703 B1 | 4/2001 | Novich |
| 6,237,369 B1 | 5/2001 | LeBlanc et al. |
| 6,241,514 B1 | 6/2001 | Joshi et al. |
| 6,244,197 B1 | 6/2001 | Coble |
| 6,244,857 B1 | 6/2001 | VonDrasek et al. |
| 6,247,315 B1 | 6/2001 | Marin et al. |
| 6,250,136 B1 | 6/2001 | Igreja |
| 6,250,916 B1 | 6/2001 | Phillipe et al. |
| 6,274,164 B1 | 8/2001 | Novich |
| 6,276,924 B1 | 8/2001 | Joshi et al. |
| 6,276,928 B1 | 8/2001 | Joshi et al. |
| 6,293,277 B1 | 9/2001 | Panz et al. |
| 6,314,760 B1 | 11/2001 | Chenoweth |
| 6,314,896 B1 | 11/2001 | Marin et al. |
| 6,332,339 B1 | 12/2001 | Kawaguchi et al. |
| 6,338,337 B1 | 1/2002 | Panz et al. |
| 6,339,610 B1 | 1/2002 | Hoyer et al. |
| 6,344,747 B1 | 2/2002 | Lunghofer et al. |
| 6,357,264 B1 | 3/2002 | Richards |
| 6,386,271 B1 | 5/2002 | Kawamoto et al. |
| 6,418,755 B2 | 7/2002 | Chenoweth |
| 6,422,041 B1 | 7/2002 | Simpson et al. |
| 6,454,562 B1 | 9/2002 | Joshi et al. |
| 6,460,376 B1 | 10/2002 | Jeanvoine et al. |
| 6,536,238 B2 | 3/2003 | Kawaguchi et al. |
| 6,536,651 B2 | 3/2003 | Ezumi et al. |
| 6,558,606 B1 | 5/2003 | Kulkarni et al. |
| 6,578,779 B2 | 6/2003 | Dion |
| 6,660,106 B1 | 12/2003 | Babel et al. |
| 6,694,791 B1 | 2/2004 | Johnson et al. |
| 6,701,617 B2 | 3/2004 | Li et al. |
| 6,701,751 B2 | 3/2004 | Arechaga et al. |
| 6,705,118 B2 | 3/2004 | Simpson et al. |
| 6,708,527 B1 | 3/2004 | Ibarlucea et al. |
| 6,711,942 B2 | 3/2004 | Getman et al. |
| 6,715,319 B2 | 4/2004 | Barrow et al. |
| 6,722,161 B2 | 4/2004 | LeBlanc |
| 6,736,129 B1 | 5/2004 | Sjith |
| 6,739,152 B2 | 5/2004 | Jeanvoine et al. |
| 6,796,147 B2 | 9/2004 | Borysowicz et al. |
| 6,797,351 B2 | 9/2004 | Kulkarni et al. |
| 6,854,290 B2 | 2/2005 | Hayes et al. |
| 6,857,999 B2 | 2/2005 | Jeanvoine |
| 6,883,349 B1 | 4/2005 | Jeanvoine |
| 6,918,256 B2 | 7/2005 | Gutmark et al. |
| 7,027,467 B2 | 4/2006 | Baev et al. |
| 7,116,888 B1 | 10/2006 | Aitken et al. |
| 7,134,300 B2 | 11/2006 | Hayes et al. |
| 7,168,395 B2 | 1/2007 | Engdahl |
| 7,175,423 B1 | 2/2007 | Pisano et al. |
| 7,231,788 B2 | 6/2007 | Karetta et al. |
| 7,273,583 B2 | 9/2007 | Rue et al. |
| 7,330,634 B2 | 2/2008 | Aitken et al. |
| 7,383,698 B2 | 6/2008 | Ichinose et al. |
| 7,392,668 B2 | 7/2008 | Adams et al. |
| 7,428,827 B2 | 9/2008 | Maugendre et al. |
| 7,441,686 B2 | 10/2008 | Odajima et al. |
| 7,448,231 B2 | 11/2008 | Jeanvoine et al. |
| 7,454,925 B2 | 11/2008 | DeAngelis et al. |
| 7,509,819 B2 | 3/2009 | Baker et al. |
| 7,565,819 B2 | 7/2009 | Jeanvoine et al. |
| 7,578,988 B2 | 8/2009 | Jacques et al. |
| 7,581,948 B2 | 9/2009 | Borders et al. |
| 7,622,677 B2 | 11/2009 | Barberree et al. |
| 7,624,595 B2 | 12/2009 | Jeanvoine et al. |
| 7,748,592 B2 | 7/2010 | Koga et al. |
| 7,767,606 B2 | 8/2010 | McGinnis et al. |
| 7,778,290 B2 | 8/2010 | Sacks et al. |
| 7,781,562 B2 | 8/2010 | Crawford et al. |
| 7,802,452 B2 | 9/2010 | Borders et al. |
| 7,832,365 B2 | 11/2010 | Hannum et al. |
| 7,845,314 B2 | 12/2010 | Smith |
| 7,855,267 B2 | 12/2010 | Crawford et al. |

(56) References Cited

U.S. PATENT DOCUMENTS

| | | |
|---|---|---|
| 7,946,136 B2 | 5/2011 | Watkinson |
| 8,033,254 B2 | 10/2011 | Hannum et al. |
| 8,279,899 B2 | 10/2012 | Kitabayashi |
| 8,285,411 B2 | 10/2012 | Hull et al. |
| 8,402,787 B2 | 3/2013 | Pernode et al. |
| 8,424,342 B2 | 4/2013 | Kiefer et al. |
| 8,487,262 B2 | 7/2013 | Damm et al. |
| 8,650,914 B2 | 2/2014 | Charbonneau |
| 8,707,739 B2 | 4/2014 | Huber et al. |
| 8,707,740 B2 | 4/2014 | Huber et al. |
| 8,769,992 B2 | 7/2014 | Huber |
| 8,875,544 B2 | 11/2014 | Charbonneau |
| 8,973,400 B2 | 3/2015 | Charbonneau et al. |
| 8,991,215 B2 | 3/2015 | Shock et al. |
| 8,997,525 B2 | 4/2015 | Shock et al. |
| 9,021,838 B2 | 5/2015 | Charbonneau et al. |
| 9,032,760 B2 | 5/2015 | Charbonneau et al. |
| 9,096,452 B2 | 8/2015 | Charbonneau et al. |
| 9,096,453 B2 | 8/2015 | Charbonneau |
| 2001/0039813 A1 | 11/2001 | Simpson et al. |
| 2002/0086077 A1 | 7/2002 | Noller et al. |
| 2002/0124598 A1 | 9/2002 | Borysowicz et al. |
| 2002/0134112 A1 | 9/2002 | Barrow et al. |
| 2002/0152770 A1 | 10/2002 | Becher et al. |
| 2002/0162358 A1 | 11/2002 | Jeanvoine et al. |
| 2002/0166343 A1 | 11/2002 | LeBlanc |
| 2003/0000250 A1 | 1/2003 | Arechaga et al. |
| 2003/0015000 A1 | 1/2003 | Hayes et al. |
| 2003/0029197 A1 | 2/2003 | Jeanvoine et al. |
| 2003/0037571 A1 | 2/2003 | Kobayashi et al. |
| 2004/0025569 A1 | 2/2004 | Damm et al. |
| 2004/0099009 A1 | 5/2004 | Linz et al. |
| 2004/0128098 A1 | 7/2004 | Neuhaus et al. |
| 2004/0131988 A1 | 7/2004 | Baker et al. |
| 2004/0168474 A1 | 9/2004 | Jeanvoine et al. |
| 2004/0174920 A1 | 9/2004 | Popenov et al. |
| 2004/0224833 A1 | 11/2004 | Jeanvoine et al. |
| 2005/0039491 A1 | 2/2005 | Maugendre et al. |
| 2005/0061030 A1 | 3/2005 | Ichinose et al. |
| 2005/0083989 A1 | 4/2005 | Leister et al. |
| 2005/0103323 A1 | 5/2005 | Engdal |
| 2005/0236747 A1 | 10/2005 | Rue et al. |
| 2006/0000239 A1 | 1/2006 | Jeanvoine et al. |
| 2006/0101859 A1 | 5/2006 | Tagaki et al. |
| 2006/0122450 A1 | 6/2006 | Kim et al. |
| 2006/0144089 A1 | 7/2006 | Eichholz et al. |
| 2006/0162387 A1 | 7/2006 | Schmitt et al. |
| 2006/0174655 A1 | 8/2006 | Kobayashi et al. |
| 2006/0177785 A1 | 8/2006 | Varagani et al. |
| 2006/0233512 A1 | 10/2006 | Aitken et al. |
| 2006/0257097 A1 | 11/2006 | Aitken et al. |
| 2006/0287482 A1 | 12/2006 | Crawford et al. |
| 2006/0293494 A1 | 12/2006 | Crawford et al. |
| 2006/0293495 A1 | 12/2006 | Crawford et al. |
| 2007/0051136 A1 | 3/2007 | Watkinson |
| 2007/0106054 A1 | 5/2007 | Crawford et al. |
| 2007/0122332 A1 | 5/2007 | Jacques et al. |
| 2007/0130994 A1 | 6/2007 | Boratav et al. |
| 2007/0137259 A1 | 6/2007 | Borders et al. |
| 2007/0212546 A1 | 9/2007 | Jeanvoine et al. |
| 2007/0220922 A1 | 9/2007 | Bauer et al. |
| 2007/0266737 A1 | 11/2007 | Rodek et al. |
| 2007/0278404 A1 | 12/2007 | Spanke et al. |
| 2008/0035078 A1 | 2/2008 | Li |
| 2008/0227615 A1 | 9/2008 | McGinnis et al. |
| 2008/0256981 A1 | 10/2008 | Jacques et al. |
| 2008/0276652 A1 | 11/2008 | Bauer et al. |
| 2008/0278404 A1 | 11/2008 | Blalock et al. |
| 2008/0293857 A1 | 11/2008 | Crawford et al. |
| 2008/0302136 A1 | 12/2008 | Bauer et al. |
| 2009/0042709 A1 | 2/2009 | Jeanvoine et al. |
| 2009/0044568 A1 | 2/2009 | Lewis |
| 2009/0120133 A1 | 5/2009 | Fraley et al. |
| 2009/0176639 A1 | 7/2009 | Jacques et al. |
| 2009/0220899 A1 | 9/2009 | Spangelo et al. |
| 2009/0235695 A1* | 9/2009 | Pierrot ............... C03B 5/20 65/356 |
| 2009/0320525 A1 | 12/2009 | Johnson |
| 2010/0064732 A1 | 3/2010 | Jeanvoine et al. |
| 2010/0068665 A1 | 3/2010 | Leroux et al. |
| 2010/0087574 A1 | 4/2010 | Crawford et al. |
| 2010/0089383 A1 | 4/2010 | Cowles |
| 2010/0120979 A1 | 5/2010 | Crawford et al. |
| 2010/0139325 A1 | 6/2010 | Watkinson |
| 2010/0143601 A1 | 6/2010 | Hawtof et al. |
| 2010/0162757 A1 | 7/2010 | Brodie |
| 2010/0227971 A1 | 9/2010 | Crawford et al. |
| 2010/0236323 A1 | 9/2010 | D'Angelico et al. |
| 2010/0242543 A1 | 9/2010 | Ritter et al. |
| 2010/0300153 A1 | 12/2010 | Zhang et al. |
| 2010/0304314 A1 | 12/2010 | Rouchy et al. |
| 2010/0307196 A1 | 12/2010 | Richardson |
| 2010/0313604 A1 | 12/2010 | Watson et al. |
| 2010/0319404 A1 | 12/2010 | Borders et al. |
| 2010/0326137 A1 | 12/2010 | Rouchy et al. |
| 2011/0048125 A1 | 3/2011 | Jackson et al. |
| 2011/0054091 A1 | 3/2011 | Crawford et al. |
| 2011/0061642 A1 | 3/2011 | Rouchy et al. |
| 2011/0088432 A1 | 4/2011 | Purnode et al. |
| 2011/0107670 A1 | 5/2011 | Galley et al. |
| 2011/0236846 A1* | 9/2011 | Rue ............... F27B 3/205 432/195 |
| 2011/0308280 A1 | 12/2011 | Huber |
| 2012/0033792 A1 | 2/2012 | Kulik et al. |
| 2012/0077135 A1 | 3/2012 | Charbonneau |
| 2012/0104306 A1 | 5/2012 | Kamiya et al. |
| 2012/0216567 A1 | 8/2012 | Boughton et al. |
| 2012/0216568 A1 | 8/2012 | Fisher et al. |
| 2012/0216576 A1 | 8/2012 | Boughton et al. |
| 2013/0072371 A1 | 3/2013 | Jansen et al. |
| 2013/0086944 A1 | 4/2013 | Shock et al. |
| 2013/0086949 A1 | 4/2013 | Charbonneau |
| 2013/0086950 A1 | 4/2013 | Huber et al. |
| 2013/0086951 A1 | 4/2013 | Charbonneau et al. |
| 2013/0086952 A1 | 4/2013 | Charbonneau et al. |
| 2013/0123990 A1 | 5/2013 | Kulik et al. |
| 2013/0279532 A1 | 10/2013 | Ohmstede et al. |
| 2013/0283861 A1 | 10/2013 | Mobley et al. |
| 2013/0327092 A1 | 12/2013 | Charbonneau |
| 2014/0090422 A1 | 4/2014 | Charbonneau et al. |
| 2014/0090423 A1* | 4/2014 | Charbonneau ........... C03B 5/04 65/134.5 |
| 2014/0144185 A1 | 5/2014 | Shock et al. |
| 2015/0225274 A1* | 8/2015 | Solvang ............... C03B 5/12 65/470 |

FOREIGN PATENT DOCUMENTS

| | | |
|---|---|---|
| EP | 0 181 248 B1 | 10/1989 |
| EP | 1 337 789 B1 | 12/2004 |
| EP | 1 990 321 A1 | 11/2008 |
| EP | 2 138 465 A2 | 12/2009 |
| EP | 1 986 966 B1 | 4/2010 |
| EP | 1 667 934 B1 | 2/2011 |
| EP | 2 397 446 A2 | 12/2011 |
| EP | 2 404 880 A1 | 1/2012 |
| EP | 2 433 911 A1 | 3/2012 |
| EP | 2 578 548 A2 | 4/2013 |
| GB | 191301772 | 1/1914 |
| GB | 191407633 | 3/1914 |
| GB | 164073 A | 5/1921 |
| GB | 1449439 | 9/1976 |
| KR | 100465272 B1 | 12/2004 |
| SU | 425 853 A2 | 4/1974 |
| WO | 1998055411 A1 | 12/1998 |
| WO | 2008103291 A1 | 8/2008 |
| WO | 2009091558 A1 | 7/2009 |
| WO | 2010011701 A2 | 1/2010 |
| WO | 2010045196 A3 | 4/2010 |
| WO | 2012005768 A1 | 1/2012 |

(56) References Cited

FOREIGN PATENT DOCUMENTS

| WO | 2012048790 A1 | 4/2012 |
|---|---|---|
| WO | 2013/152012 A1 | 10/2013 |

OTHER PUBLICATIONS

"AccuTru Temperature Measurement," AccuTru International Corporation, 2003.
"Glass Technologies—The Legacy of a Successful Public-Private Partnership", 2007, U.S. Department of Energy, pp. 1-32.
"Green Melting Technology—A Technical and Economic Assessment," 2004, U.S. Department of Energy, pp. 1-292.
Muijsenberg, H. P. H., Neff, G., Muller, J., Chmelar, J., Bodi, R. and Matustikj, F. (2008) "An Advanced Control System to Increase Glass Quality and Glass Production Yields Based on GS ESLLI Technology", in a Collection of Papers Presented at the 66th Conference on Glass Problems: Ceramic Engineering and Science Proceedings, vol. 27, Issue 1 (ed W. M. Kriven), John Wiley & Sons, Inc., Hoboken, NJ, USA. doi: 10.1002/9780470291306.ch3.
Rue, "Energy-Efficient Glass Melting—The Next Generation Melter", Gas Technology Institute, Project No. 20621 Final Report (2008).
Muijsenberg, E., Eisenga, M, and Buchmayer, J. (2010) "Increase of Glass Production Efficiency and Energy Efficiency with Model-Based Predictive Control", in 70th Conference on Glass Problems: Ceramic Engineering and Science Proceedings, vol. 31, Issue 1 (ed C. H. Drummond), John Wiley & Sons, Inc., Hoboken, NJ, USA. doi: 10.1002/9780470769843.ch15.
Sims, Richard, "Batch charging technologies—a review", www.glassonweb.com, Nikolaus Sorg Gmbh & Co KG (May 2011).
"Canty Process Technology" brochure, date unknown, at American Institute of Chemical Engineers, Spring Meeting, Houston, TX.
"Glass Melting", Battelle PNNL MST Handbook, U.S. Department of Energy, Pacific Northwest Laboratory, retrieved from the Internet Apr. 20, 2012.
"Roll Compaction", brochure from The Fitzpatrick Company, Elmhurst, Illinois, retrieved from the Internet Apr. 20, 2012.
"Glass industry of the Future", United States Department of Energy, report 02-GA50113-03, pp. 1-17, Sep. 30, 2008.
Clare et al., "Density and Surface Tension of Borate Containing Silicate Melts", Glass Technology—European Journal of Glass Science and Technology, Part A, pp. 59-62, vol. 44, No. 2, Apr. 1, 2003.
Seward, T.P., "Modeling of Glass Making Processes for Improved Efficiency", DE-FG07-96EE41262, Final Report, Mar. 31, 2003.
Conradt et al, Foaming behavior on glass melts, Glastechniche Berichte 60 (1987) Nr. 6, S. 189-201 Abstract Fraunhofer ISC.
Kim et al., "Foaming in Glass Melts Produced by Sodium Sulfate Decomposition under Isothermal Conditions", Journal of the American Ceramic Society, 74(3), pp. 551-555, 1991.
Kim et al., "Foaming in Glass Melts Produced by Sodium Sulfate Decomposition under Ramp Heating Conditions", Journal of the American Ceramic Society, 75(11), pp. 2959-2963, 1992.
Kim et al., "Effect of Furnace Atmosphere on E-glass Foaming", Journal of Non-Crystalline Solids, 352(50/51), pp. 5287-5295, 2006.
Van Limpt et al., "Modelling the evaporation of boron species. Part 1. Alkali-free borosilicate glass melts", Glass Technology—European Journal of Glass Science and Technology, Part A, 52(3): pp. 77-87, 2011.
Oblain, V.M. et al, "Submerged Combustion Furnace for Glass Melts," Ceramic Engineering and Science Proceedings, Jan. 1, 1996, pp. 84-92, vol. 17—No. 2, American Ceramic Society Inc., US.
Report for Treating Hanford LAW and WTP SW Simulants: Pilot Plant Mineralizing Flowsheet Apr. 2009, Department of Energy Environmental Management Consolidated Business Center by THOR Treatment Technologies, LLC.
Rue et al, "Submerged Combustion Melting of Glass," International Journal of Applied Glass Science, Nov. 9, 2011, pp. 262-274, vol. 2, No. 4.
National Laboratory, US DOE contract No. DE-AC09-08SR22470, Oct. 2011.
Higley, BA, Glass Melter System Technologies for Vitrification of High-Sodium Content Low-Level, Radioactive, Liquid Wastes—Phase I: SBS Demonstration With Simulated Low—Level Waste—Final Test Report, Westinghouse Hanford Company, pp. 89-165, in particular p. 164, Sep. 1, 1995.

\* cited by examiner

METHODS OF MELTING FEEDSTOCK USING A SUBMERGED COMBUSTION MELTER

BACKGROUND INFORMATION

Technical Field

The present disclosure relates generally to the field of submerged combustion melters and apparatus, and methods of use, and more specifically to submerged combustion melters, and methods of operating same, particularly for melting glass-forming materials, mineral wool forming materials, and other non-metallic inorganic materials.

Background Art

A submerged combustion melter (SCM) may be employed to melt glass batch and/or waste glass materials to produce molten glass, or may melt mineral wool feedstock (basalt rock, sometimes referred to as lava rock) to make mineral or rock wool, by passing oxygen, oxygen-enriched mixtures, or air along with a liquid, gaseous and/or particulate fuel (some of which may be in one or more of the feedstock materials), directly into a molten pool of glass or other material, usually through burners submerged in a turbulent melt pool. The introduction of high flow rates of products of combustion of the oxidant and fuel into the molten material, and the expansion of the gases during submerged combustion (SC), cause rapid melting of the feedstock and much turbulence and foaming. Conventional melters operate primarily by combusting fuel and oxidant above the molten pool of melt, and are very laminar in flow characteristics compared to SCMs.

Residence time of the material being melted in the SCM is critical to achieving good quality product. Channeling (feedstock exiting the SCM before being well mixed or melted) is problematic as it is wasteful and decreases melt quality. It would be advantageous to maximize mixing and/or heating (increase temperature) in SCMs in order to improve the quality (mainly determined by homogeneity) of the melt from an SCM.

SUMMARY

In accordance with the present disclosure, methods of maximize mixing and/or heating (increase temperature) in SCMs using "SC burner profiling" in order to improve the quality (mainly determined by homogeneity) of the melt from an SCM, and/or or reduce feedstock loss through SCM exhaust, are described that may reduce or eliminate problems with known SCM operation to produce molten glass and other non-metallic inorganic materials, such as rock wool and mineral wool.

One aspect of this disclosure is a method of maximizing mixing and melting in an SCM, the method comprising (or consisting essentially of, or consisting of):
 (a) melting an inorganic feedstock in an SCM using an arrangement of two or more SC burners, the SCM having a length (L) and a width (W), a centerline (C), a north side (N) and a south side (S); and
 (b) operating the arrangement of SC burners such that a progressively higher percentage of a total combustion flow from the SC burners occurs from SC burners at progressively downstream positions.

Another method of the disclosure is a method maximizing mixing and melting in an SCM, the method comprising (or consisting essentially of, or consisting of):
 (a) melting an inorganic feedstock in an SCM using an arrangement of two or more SC burners, the SCM having a length (L) and a width (W), a centerline (C), a north side (N) and a south side (S); and
 (b) operating the arrangement of SC burners such that a progressively lower percentage of total combustion flow rate from the SC burners occurs from SC burners at progressively downstream positions from the feed end of the SCM up to a midpoint (M) of the SCM length (L), and such that a progressively higher percentage of total combustion flow rate from the SC burners occurs from SC burners at progressively downstream positions from the midpoint (M) to the melt exit end of the SCM.

Other method and apparatus embodiments, such as detailed herein, are considered aspects of this disclosure. Systems, apparatus, and methods of the disclosure will become more apparent upon review of the brief description of the drawings, the detailed description of the disclosure, and the claims that follow.

BRIEF DESCRIPTION OF THE DRAWINGS

The manner in which the objectives of the disclosure and other desirable characteristics can be obtained is explained in the following description and attached drawings in which.

Figure 1:
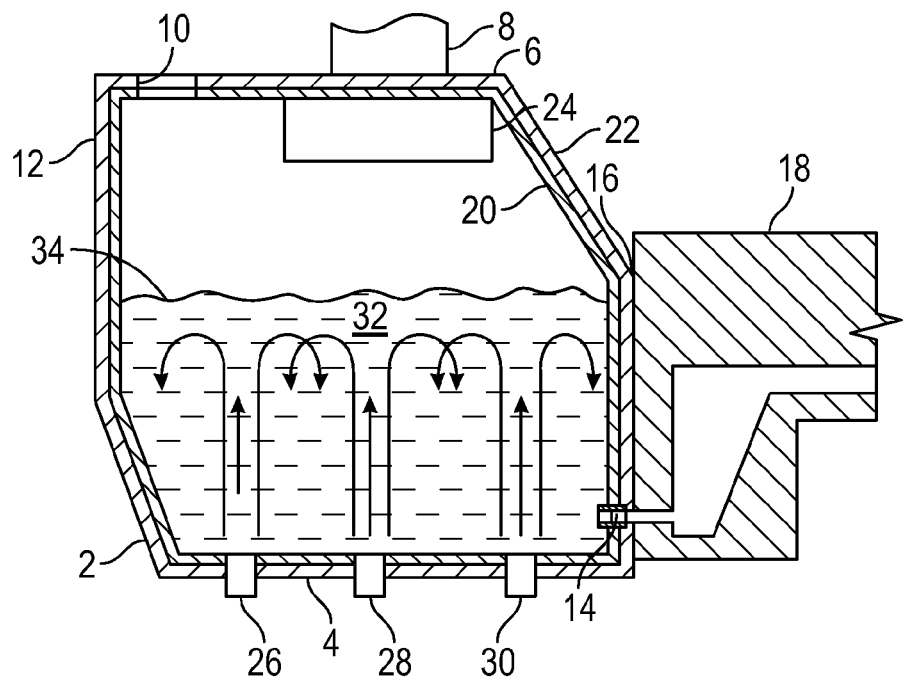
FIG. 1 is a schematic side elevation view, partially in cross-section, of a prior art submerged combustion melter and method.

It is to be noted, however, that the appended drawings are schematic in nature, may not be to scale, and illustrate only typical embodiments of this disclosure and are therefore not to be considered limiting of its scope, for the disclosure may admit to other equally effective embodiments.

DETAILED DESCRIPTION

In the following description, numerous details are set forth to provide an understanding of the disclosed systems, apparatus, and methods. However, it will be understood by those skilled in the art that the systems, apparatus, and methods covered by the claims may be practiced without these details and that numerous variations or modifications from the specifically described embodiments may be possible and are deemed within the claims. For example, wherever the term "comprising" is used, embodiments and/or components where "consisting essentially of" and "consisting of" are explicitly disclosed herein and are part of this disclosure. All U.S. published patent applications and U.S. Patents referenced herein are hereby explicitly incorporated herein by reference. In the event definitions of terms in the referenced patents and applications conflict with how those terms are defined in the present application, the definitions for those terms that are provided in the present application shall be deemed controlling. All percentages herein are based on weight unless otherwise specified.

As explained briefly in the Background, one drawback to present operation of SCMs is that channeling (feedstock exiting the SCM before being well mixed or melted) is problematic as it is wasteful and decreases melt quality. It would therefore be extremely advantageous to maximize mixing and/or heating (increase temperature) in SCMs in order to improve the quality (mainly determined by homogeneity) of the melt from an SCM. Inventors herein have discovered various "burner profiles" that achieve the desired goal of increased residence time of the material being melted in the SCM, which is critical to achieving good quality product.

There are innumerable options, variations within options, and sub-variations of options for the SCM operator to select from when operating an SCM and profiling the SC burners. After all, the SCM is essentially a continuous or semi-batch chemical reactor with simultaneous heat and mass transfer. For example, to name just a few, an operator may choose (option 1) to operate all SC burners equally, that is, using the same fuel and oxidant, and of the total combustion flow rate (TCFR) from the SC burners, each SC burner is operated to produce the same fraction of the TCFR. Another option (option 2) would be to operate as option 1, but with different oxidant in one or more burners. Option 3 may be to operate with same oxidant in all burners, but with different fuel in one or more SC burners. As one can readily see, the number of options is quite large, and selecting the operation of the SC burners in such a chemical reactor with simultaneous heat and mass transfer can be an overwhelming task. Even if the "same" fuel and "same" oxidant are used for each SC burner (an ideal assumption that is never true in practice, since fuel and oxidant compositions change with time), the variations are endless, and can be an overwhelming task to sort through.

The present disclosure is devoted to resolving this challenge by "burner profiling", in other words, closely adjusting each burner's combustion flow rate so that residence time of feedstock is maximized the melter, and/or increasing mixing and/or temperature, or increasing mixing of melt in the melter without an increase in temperature.

Various terms are used throughout this disclosure. The terms "process" and method" are considered interchangeable. "Submerged" as used herein means that combustion gases emanate from combustion burners or combustion burner panels under the level of the molten glass; the burners or burner panels may be floor-mounted, wall-mounted, or in melter embodiments comprising more than one submerged combustion burner, any combination thereof (for example, two floor mounted burner panels and one wall mounted burner panel). Burner panels (such as described in assignee's co-pending U.S. patent application Ser. No. 14/838,148, filed Aug. 27, 2015 may form part of an SCM floor and/or wall structure. In certain embodiments one or more burner panels described herein may form the entire floor. A "burner panel" is simply a panel equipped to emit fuel and oxidant, or in some embodiments only one of these (for example a burner panel may only emit fuel, while another burner panel emits only oxidant, and vice versa). "SC" as used herein means "submerged combustion" unless otherwise specifically noted, and "SCM" means submerged combustion melter unless otherwise specifically noted.

As used herein the phrase "combustion gases" as used herein means substantially gaseous mixtures comprised primarily of combustion products, such as oxides of carbon (such as carbon monoxide, carbon dioxide), oxides of nitrogen, oxides of sulfur, and water, as well as partially combusted fuel, non-combusted fuel, and any excess oxidant. Combustion products may include liquids and solids, for example soot and unburned liquid fuels. "Exhaust", "melter exhaust", and "melter flue gas" are equivalent terms and refer to a combination of combustion gases and effluent from the feedstock being melted, such as adsorbed water, water of hydration, $CO_2$ liberated from $CaCO_3$, and the like. Therefore exhaust may comprise oxygen or other oxidants, nitrogen, combustion products (including but not limited to, carbon dioxide, carbon monoxide, $NO_x$, $SO_x$, $H_2S$, and water), uncombusted fuel, reaction products of melt-forming ingredients (for example, but not limited to, basalt, sand (primarily $SiO_2$), clay, limestone (primarily $CaCO_3$), burnt dolomitic lime, borax and boric acid, and the like.

As used herein, unless indicated to the contrary, "feedstock" includes, but is not limited to: glass batch; cullet; and pieces of porous, semi-porous, or solid rock or other non-metallic inorganic material having a weight average particle size ranging from about 1 mm to about 10 cm, or from about 1 cm to about 10 cm, or from about 2 to about 5 cm, or from about 1 to about 2 cm. The only upper limit on feedstock weight average particle size is the internal diameter of feedstock supply structure components, such as described in assignee's co-pending U.S. patent application Ser. No. 14/844,198, filed Sep. 3, 2015, while the lower size limit is determined by angle of flow, flow rate of feedstock, and in those embodiments where heat is exchanged directly or indirectly from melter exhaust to the feedstock, flow rate of melter exhaust.

"Oxidant" as used herein includes air, gases having the same molar concentration of oxygen as air (for example "synthetic air"), oxygen-enriched air (air having oxygen concentration greater than 21 mole percent), and "pure" oxygen grades, such as industrial grade oxygen, food grade oxygen, and cryogenic oxygen. Oxygen-enriched air may have 50 mole percent or more oxygen, and in certain embodiments may be 90 mole percent or more oxygen.

The term "fuel", according to this disclosure, means a combustible composition comprising a major portion of, for example, methane, natural gas, liquefied natural gas, propane, hydrogen, steam-reformed natural gas, atomized hydrocarbon oil, combustible powders and other flowable solids (for example coal powders, carbon black, soot, and the like), and the like. Fuels useful in the disclosure may comprise minor amounts of non-fuels therein, including oxidants, for purposes such as premixing the fuel with the oxidant, or atomizing liquid or particulate fuels. As used herein the term "fuel" includes gaseous fuels, liquid fuels, flowable solids, such as powdered carbon or particulate material, waste materials, slurries, and mixtures or other combinations thereof. Certain methods within the disclosure include methods wherein the fuel may be a substantially gaseous fuel selected from the group consisting of methane, natural gas, liquefied natural gas, propane, carbon monoxide, hydrogen, steam-reformed natural gas, atomized oil or mixtures thereof, and the oxidant may be an oxygen stream comprising at least 90 mole percent oxygen.

The sources of oxidant and fuel may be one or more conduits, pipelines, storage facilities, cylinders, or, in embodiments where the oxidant is air, ambient air. Oxygen-enriched oxidants may be supplied from a pipeline, cylinder, storage facility, cryogenic air separation unit, membrane permeation separator, or adsorption unit such as a vacuum swing adsorption unit.

Certain method embodiments may comprise a method maximizing mixing and melting in an SCM, the method comprising (or consisting essentially of, or consisting of):
(a) melting an inorganic feedstock in an SCM using an arrangement of two or more SC burners, the SCM having a length (L) and a width (W), a centerline (C), a north side (N) and a south side (S); and
(b) operating the arrangement of SC burners such that a progressively higher percentage of a total combustion flow from the SC burners occurs from SC burners at progressively downstream positions.

Certain method embodiments may include wherein the melting using an arrangement of two or more SC burners comprises melting with a matrix of at least two rows and at least two columns of SC burners wherein a row spans a majority of the width (W) and a column spans a majority of the length (L) of the SCM, and wherein the operating is selected from the group consisting of:
(c) each SC burner in a first row R1 operates at a rate $r_1$, each SC burner in a second row R2 operates at a rate $r_2$, wherein $r_2 > r_1$, and
(d) if the matrix is a two row by three column matrix or larger, SC burners on the N and S sides in the first row R1 operate at a rate $r_3$, the SC burner in the center (C) of the first row R1 operates at a rate $r_4$, where $r_3 > r_4$, and SC burners on N and S sides in a second row R2 operate at a rate $r_5$ and the SC burner in the center (C) operates at a rate $r_6$, where $r_5 > r_6 \geq r_4$, and $r_5 > r_3$.

Certain method embodiments may include wherein the melting using an arrangement of two or more SC burners comprises melting with a matrix of at least two rows and at least two columns of SC burners wherein a row spans a majority of the width (W) and a column spans a majority of the length (L) of the SCM, and wherein the operating comprises
(c) each SC burner in a first row R1 operates at a rate $r_1$, each SC burner in a second row R2 operates at a rate $r_2$, wherein $r_2 > r_1$.

Certain method embodiments may include wherein the melting using an arrangement of two or more SC burners comprises melting with a matrix of at least two rows and at least two columns of SC burners wherein a row spans a majority of the width (W) and a column spans a majority of the length (L) of the SCM, and wherein the operating comprises
(d) if the matrix is a two row by three column matrix or larger, SC burners on the N and S sides in the first row R1 operate at a rate $r_3$, and SC burners in the center (C) of the first row operate at a rate $r_4$, where $r_3 > r_4$, and SC burners on N and S sides in a second row R2 operate at a rate $r_5$ and SC burners in the center (C) operate at a rate $r_6$, where $r_5 > r_6 \geq r_4$, and $r_5 > r_3$.

Certain method embodiments may further comprise measuring concentration of a tracer compound or element in melt exiting the SCM to verify an increase in residence time of melt in the SCM compared to residence time of the melt when all SC burners are firing equally. In certain methods, the tracer compound or element may be selected from the group consisting of ZnO (zinc oxide), $SrCO_3$ (strontium carbonate), $BaCO_3$ (barium carbonate), and $Li_2CO_3$ (lithium carbonate), and mixtures and combinations thereof.

Certain method embodiments may include maximizing mixing and melting in an SCM, the method comprising (or consisting essentially of, or consisting of):
(a) melting an inorganic feedstock in an SCM using an arrangement of two or more SC burners, the SCM having a length (L) and a width (W), a centerline (C), a north side (N) and a south side (S); and
(b) operating the arrangement of SC burners such that a progressively lower percentage of total combustion flow rate from the SC burners occurs from SC burners at progressively downstream positions from the feed end of the SCM up to a midpoint (M) of the SCM length (L), and such that a progressively higher percentage of total combustion flow rate from the SC burners occurs from SC burners at progressively downstream positions from the midpoint (M) to the melt exit end of the SCM.

Certain method embodiments may include wherein the melting using an arrangement of two or more SC burners comprises melting with a matrix of at least two rows and at least two columns of SC burners wherein a row spans a majority of the width (W) and a column spans a majority of the length (L) of the SCM, and wherein the operating the arrangement of SC burners comprises operating the SC burners such that SC burners nearer the feed end of the SCM have a flow rate $r_7$, SC burners near the melt exit end have a flow rate $r_8$, and SC burners near an intersection of L and M have a flow rate $r_9$, wherein:

$r_7 > r_9$ $r_8 > r_9$, and $r_8 \geq r_7$.

Certain method embodiments may include wherein the matrix is a 3 row×3 column matrix, and SC burners on the N and S sides have flow rate greater than the center SC burners.

Certain method embodiments may include maximizing mixing and temperature increase in an SCM, the method comprising (or consisting essentially of, or consisting of):
(a) melting an inorganic feedstock in an SCM using an arrangement of two or more SC burners, the SCM having a length (L) and a width (W), a centerline (C), a north side (N) and a south side (S); and
(b) operating the arrangement of SC burners such that SC burners in a first zone of the SCM operate fuel lean, and SC burners in a second zone of the SCM operate fuel rich, and where combustion products of the SC burners in the first zone mix with combustion products of the SC burners of the second zone at a position in the SCM higher than where the lean or rich combustion takes place.

Certain method embodiments may include wherein the melting using an arrangement of two or more SC burners comprises melting with a matrix of at least two rows and at least two columns of SC burners wherein a row spans a majority of the width (W) and a column spans a majority of the length (L) of the SCM.

Certain method embodiments may include wherein the matrix is a 3 row by 3 column matrix and the first zone is at a midpoint (M) of the SCM length (L), and the second zone is downstream of the midpoint (M) of the SCM length (L).

Certain method embodiments may include wherein the matrix is a 3 row by 3 column matrix and the first zone is at a midpoint (M) of the SCM length (L), and the second zone is upstream of the midpoint (M) of the SCM length (L).

Certain method embodiments may include wherein the first (lean) zone is near the feed inlet, and the second (fuel rich) zone is immediately downstream the first zone, and including feeding small (less than 1 mm APS) particle size batch material to the SCM in the feed inlet.

Certain method embodiments may include maximizing mixing without substantially increasing temperature in an SCM, the method comprising (or consisting essentially of, or consisting of):

(a) melting an inorganic feedstock in an SCM using an arrangement of two or more SC burners, the SCM having a length (L) and a width (W), a centerline (C), a north side (N) and a south side (S); and (b) operating the arrangement of SC burners such that SC burners in a first zone of the SCM operate fuel lean, and SC burners in all other zones of the SCM operate neither fuel rich nor fuel lean.

Certain method embodiments may include wherein the lean zone is between the feed end of the SCM and the midpoint (M). Certain method embodiments may include wherein the lean zone is nearer the melter feed end than any other melting zone. Certain method embodiments may include wherein the lean zone is between the midpoint (M) and the melter exit end. Certain method embodiments may include wherein one or more SC burners is operated in pulsing mode. Certain method embodiments may include feeding large particle size feedstock (at least 10 cm APS) to the SCM inlet end.

Figure 2:
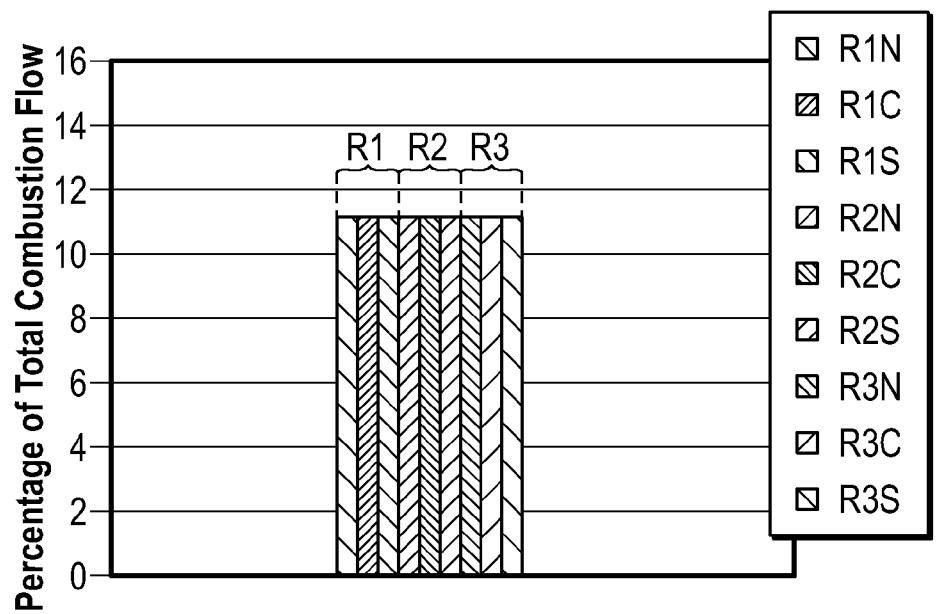
FIG. 2 is a bar graph illustrating a prior method of operating submerged combustion burners.
Figure 11:
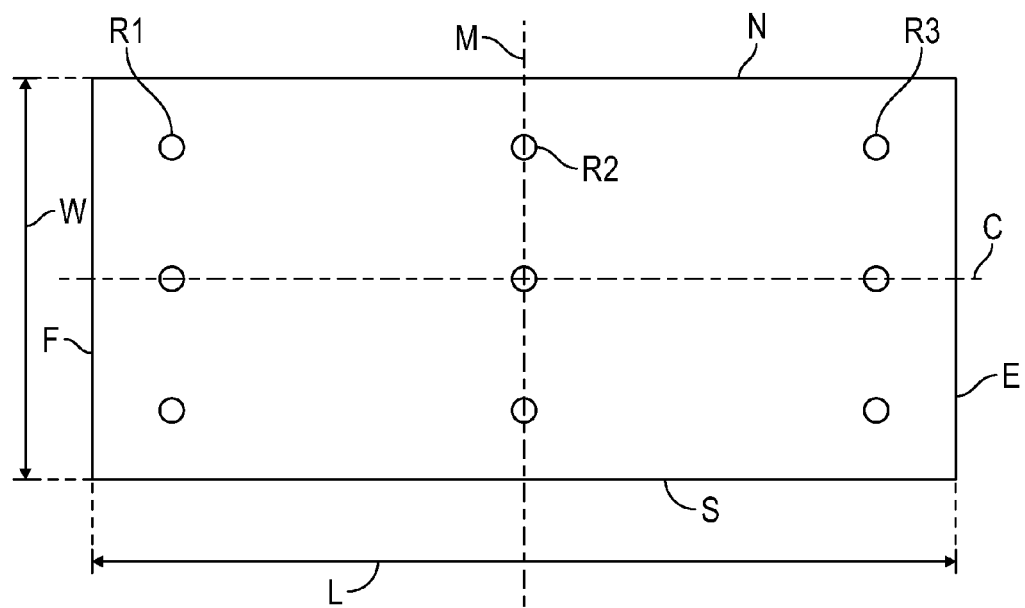
FIG. 11 is a schematic plan view of one melter floor plan in accordance with the present disclosure.

Referring now to the drawing figures, specifically FIGS. 1, 2, and 11, FIG. 1 is a schematic side elevation view, partially in cross-section, of a prior art SCM system and method, where the SC burners are arranged in a 3×3 matrix of rows and columns, as illustrated schematically in the plan view of one melter floor plan in FIG. 11. The SCM includes a sidewall structure 2, floor 4, roof or ceiling 6, exhaust stack 8, and feed or feedstock inlet 10. For purposes of description, the SCM has a feed end (or first end) 12 and a melt exit end (or second end) 16, the latter having a melt exit 14. While not important to the various SCM burner profiling embodiments described herein, the SCM is typically fluidly connected to (but not necessarily structurally connected to) a melter exit structure 18. SCM further includes a refractory lining 20, and a superstructure 22 that may comprise one or more fluid-cooled panels ("fluid-cooled" is a defined term herein). Also illustrated is a region of melter 24, one or more exhaust gas outlets that can be from the side or top of the SCM. Also illustrated schematically in FIG. 1 are positions of SC burners 26, 28, and 30, which are the centerline SC burners, turbulent melt 32 (with curved arrows indicating approximate flow pattern for burner profile of FIG. 2), and approximate surface 34 of turbulent melt 32.

Important to certain methods of the present disclosure are the definitions exemplified schematically in FIG. 11: R1, R2, and R3 designate the first row, second row, and third row of SC burners, where the first row R1 is closest to the feed end 12 of the SCM, and the third row R3 is closest to the melt exit end 16. There may be more or less than three rows of SC burners. Further defined in FIG. 11 are the length (L) of the SCM, the width (W), the midpoint (M), the centerline (C), and the north (N) and south (S) sides of the SCM, the SCM having a feed end (F, same as 12) and exit end (E, same as 16), where (F) and (E) are deemed more generic than designations 12 and 16 illustrated in FIG. 1.

Referring now specifically to FIG. 2, FIG. 2 is a bar graph illustrating a prior method of operating the nine SC burners of FIG. 11 in the SCM of FIG. 1. This method of operation is referred to as a "flat profile". As indicated in the bar graph of FIG. 2, all burners are typically operated the same, that is, all burners R1N, R1C, R1S, R2N, R2C, R2S, R3N, R3C, and R3S producing equal portions of the total combustion flow (about 11.1 percent of total).

Figure 3:
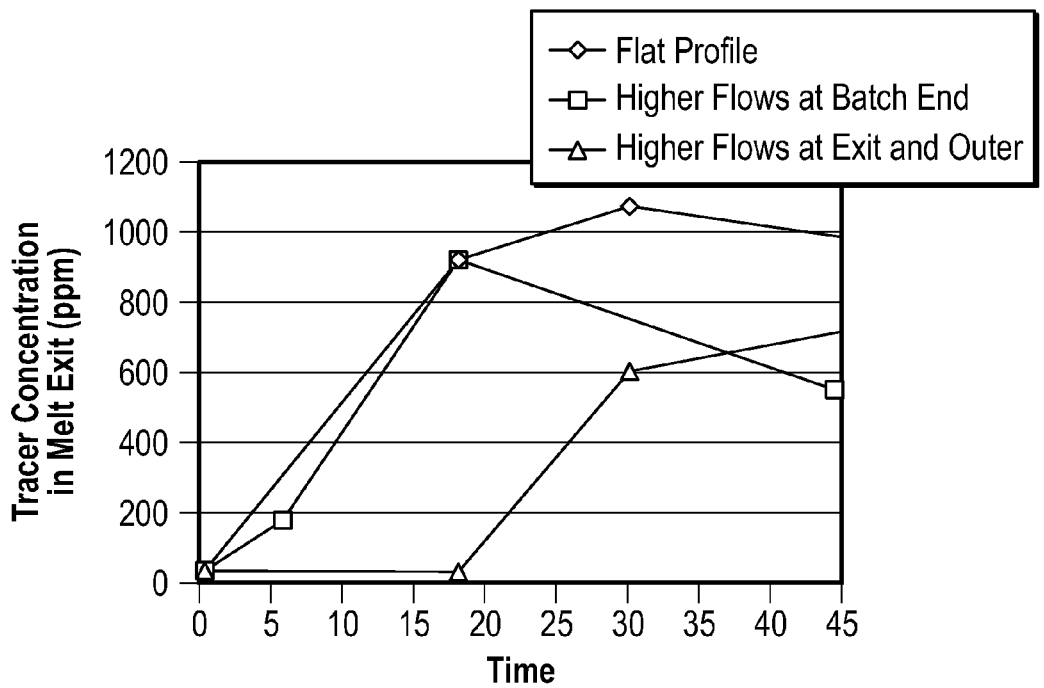
FIG. 3 is a line graph comparing tracer concentration for two prior art methods of operating the SCM of FIGS. 1 and 11 with a method of the present disclosure.
Figure 4:
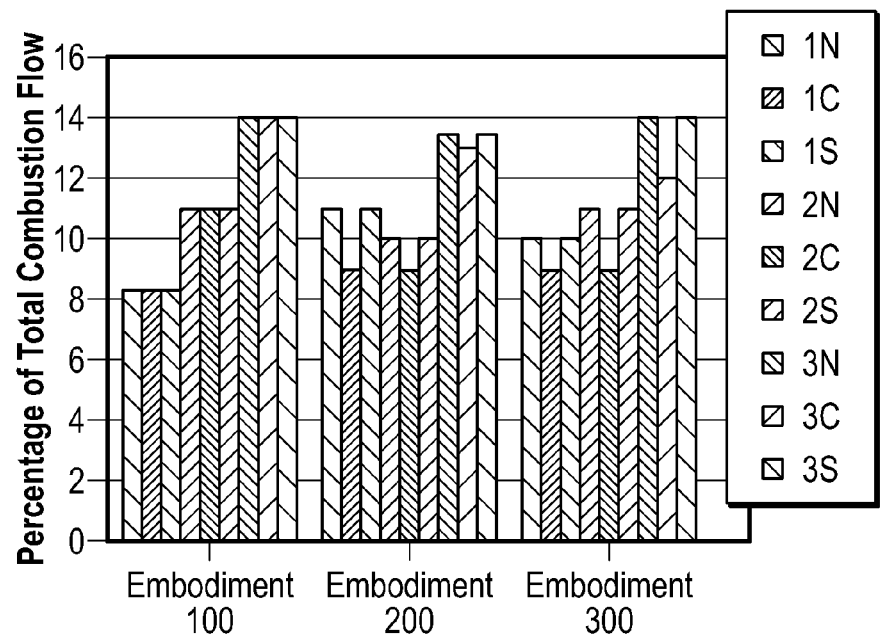
FIG. 4 is a bar graph illustrating three methods of operating submerged combustion burners in the SCM of FIG. 1 in accordance with the present disclosure.

FIG. 3 is a line graph comparing tracer concentration (in this case ZnO) for two prior art methods of operating the SCM of FIGS. 1 and 11 with a method of the present disclosure. The SC burner "flat profile" of FIG. 2 is indicated (with solid diamonds), as well as a burner profile similar to the flat profile except with higher SC burner combustion flows nearer the feed end (indicated with solid squares). Contrast those with the burner profiles of the methods designated as embodiment 100, 200, and 300 in FIG. 4, one of which (embodiment 300) is indicated in FIG. 3 with solid triangles. It may be seen in FIG. 3 that the tracer concentration in the melt exit is much lower during the first 15 to 20 minutes for the burner profile of method embodiment 300 having higher percentage of total combustion flow near the exit end of the SCM (R3) and when SC burners on both N and S sides of the SCM are operated with higher percentage of combustion flow than the C burners in the same row. Similar results were achieved for method embodiments 100 and 200. This was surprising and unexpected, as it was previously thought that the burner profile of the typical method, illustrated in FIG. 2, would produce the longest residence time for feedstock.

Figure 5:
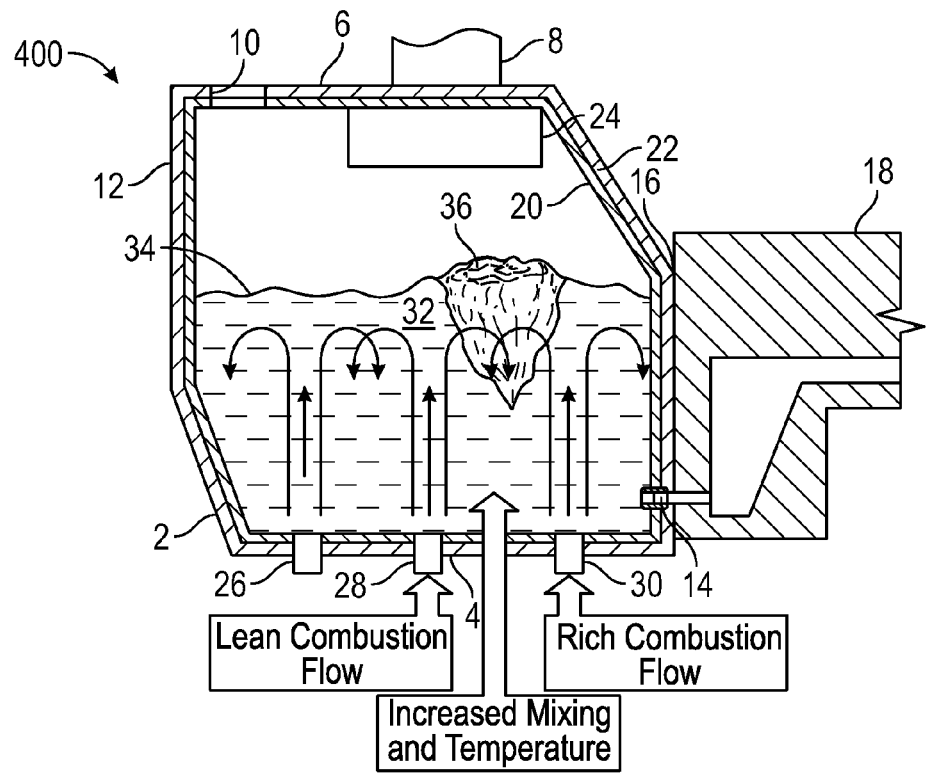
FIGS. 5 and 6 are schematic side elevation view, partially in cross-section, of a submerged combustion melter and two alternate methods of operating same in accordance with the present disclosure.
Figure 6:
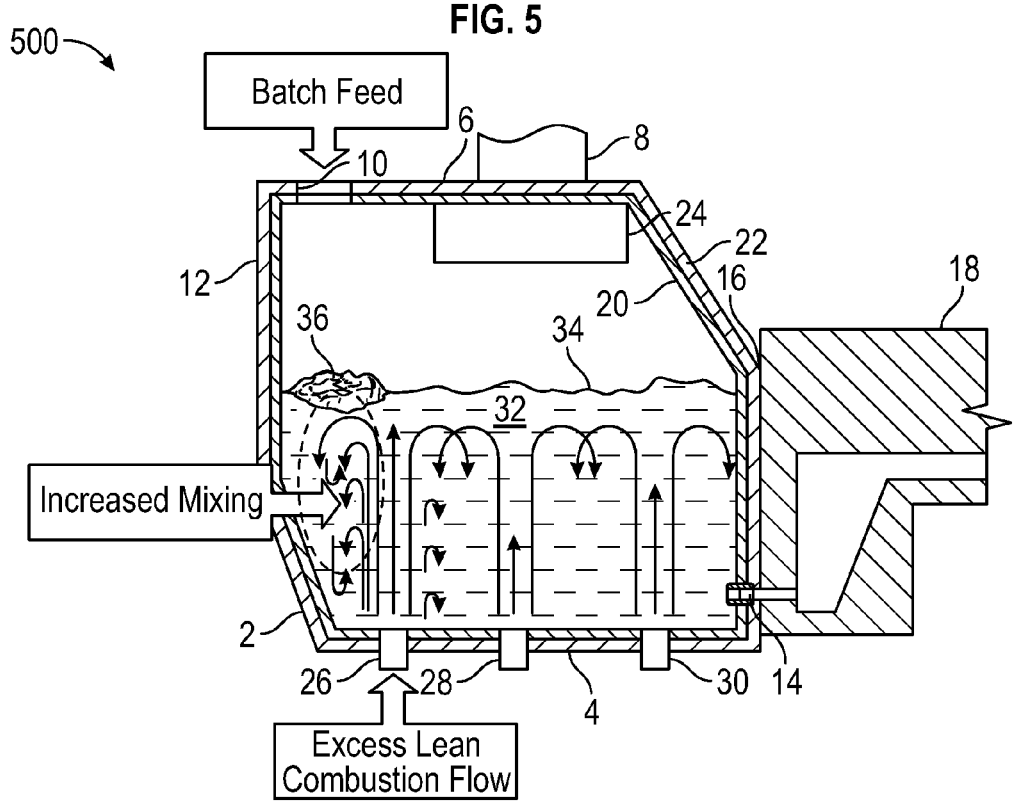

FIGS. 5 and 6 are schematic side elevation view, partially in cross-section, of an SCM and two alternate method embodiments 400 and 500, respectively, of operating the SCM in accordance with the present disclosure. Rather than adjusting position of burners and their percentage of total combustion flow rate, embodiment 400 seeks to improve quality of the melt by operating one or more SC burners in lean combustion mode, and other SC burners in rich fuel combustion mode, such that combustion is delayed until a region 36 of the turbulent melt is reached by the lean and rich combustion flows. This region 36 thus contributes to more heat of combustion being released in upper region 36, and more mixing of the melt, leading to greater homogeneity of the melt, and higher quality melt. Embodiment 500 illustrated schematically in FIG. 6 seeks to improve quality of the melt by operating one or more SC burners near the feed inlet end of the SCM in lean combustion mode, thus producing more mixing of the feedstock and the melt in this location without a significant increase in temperature. This operation of one or more SC burners in lean combustion mode may be positioned between the feed end of the SCM and the midpoint (M) of the SCM; or between the midpoint (M) and the melt exit end of the SCM, or near (or at) the midpoint (M), at or near the centerline of the SCM.

Figure 7:
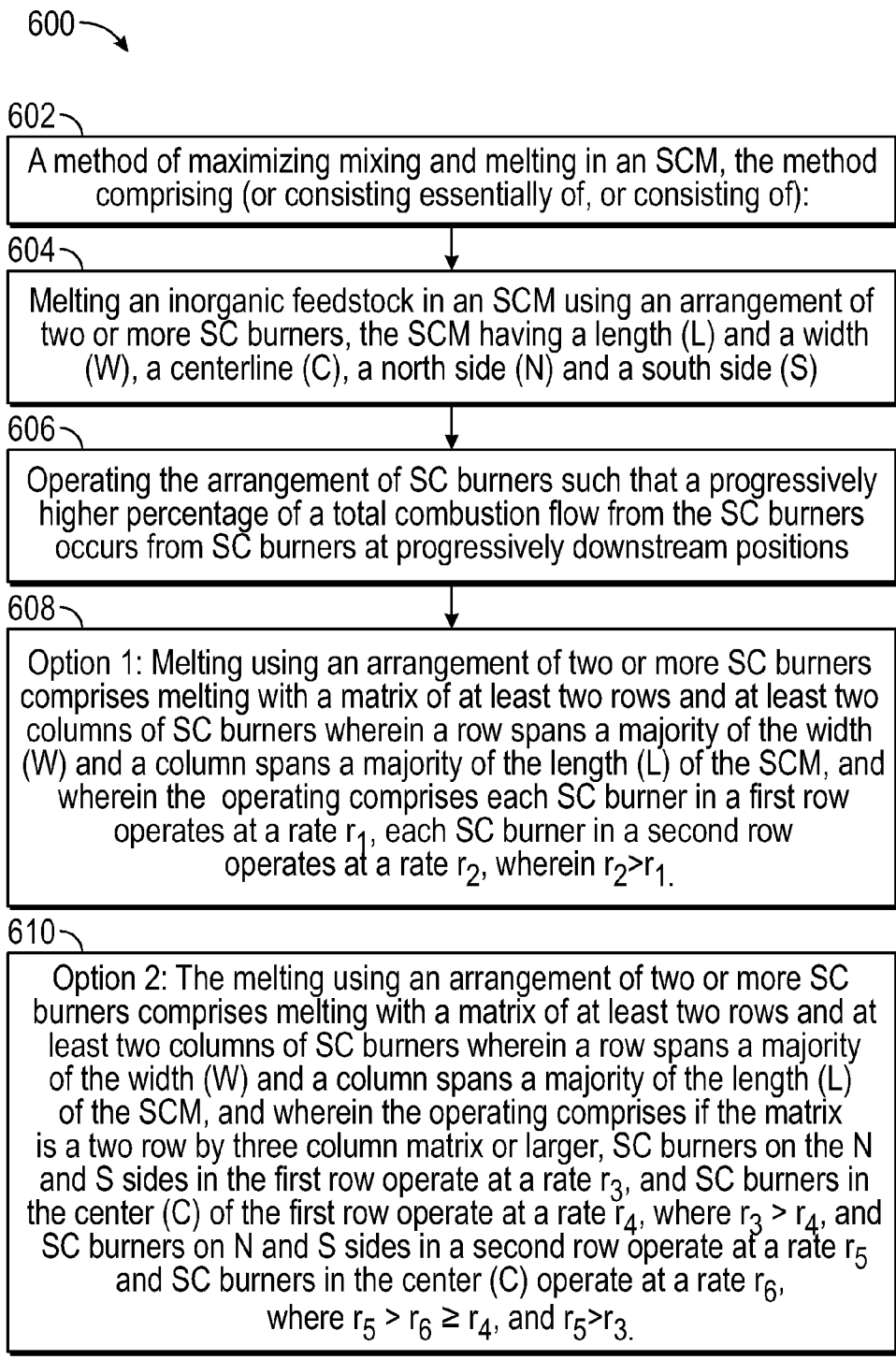
FIGS. 7, 8, 9, and 10 are logic diagrams illustrating various methods of the present disclosure.

FIGS. 7, 8, 9, and 10 are logic diagrams illustrating various methods of the present disclosure. FIG. 7 illustrates a method 600, which has at least two variations or two sub-embodiments, both having the same two initial steps, and both intended to maximize both mixing and melting in the SCM. Box 602, a method maximizing mixing and melting in an SCM, the method comprising (or consisting essentially of, or consisting of):

(a) (box 604) melting an inorganic feedstock in an SCM using an arrangement of two or more SC burners, the SCM having a length (L) and a width (W), a centerline (C), a north side (N) and a south side (S); and (b) (box 606) operating the arrangement of SC burners such that a progressively higher percentage of a total combustion flow from the SC burners occurs from SC burners at progressively downstream positions.

In sub-embodiment or option 1, box 608, the melting using an arrangement of two or more SC burners comprises melting with a matrix of at least two rows and at least two columns of SC burners wherein a row spans a majority of the width (W) and a column spans a majority of the length (L) of the SCM, and wherein the operating comprises (c) each SC burner in a first row R1 operates at a rate $r_1$, each SC burner in a second row R2 operates at a rate $r_2$, wherein $r_2 > r_1$.

In sub-embodiment or option 2, box 610, the melting using an arrangement of two or more SC burners comprises melting with a matrix of at least two rows and at least two columns of SC burners wherein a row spans a majority of the width (W) and a column spans a majority of the length (L) of the SCM, and wherein the operating comprises (d) if the matrix is a two row by three column matrix or larger, SC burners on the N and S sides in the first row R1 operate at a rate $r_3$, and SC burners in the center (C) of the first row R1 operate at a rate $r_4$, where $r_3 > r_4$, and SC burners on N and S sides in a second row R2 operate at a rate $r_5$ and SC burners in the center (C) operate at a rate $r_6$, where $r_5 > r_6 \geq r_4$, and $r_5 > r_3$.

Figure 8:
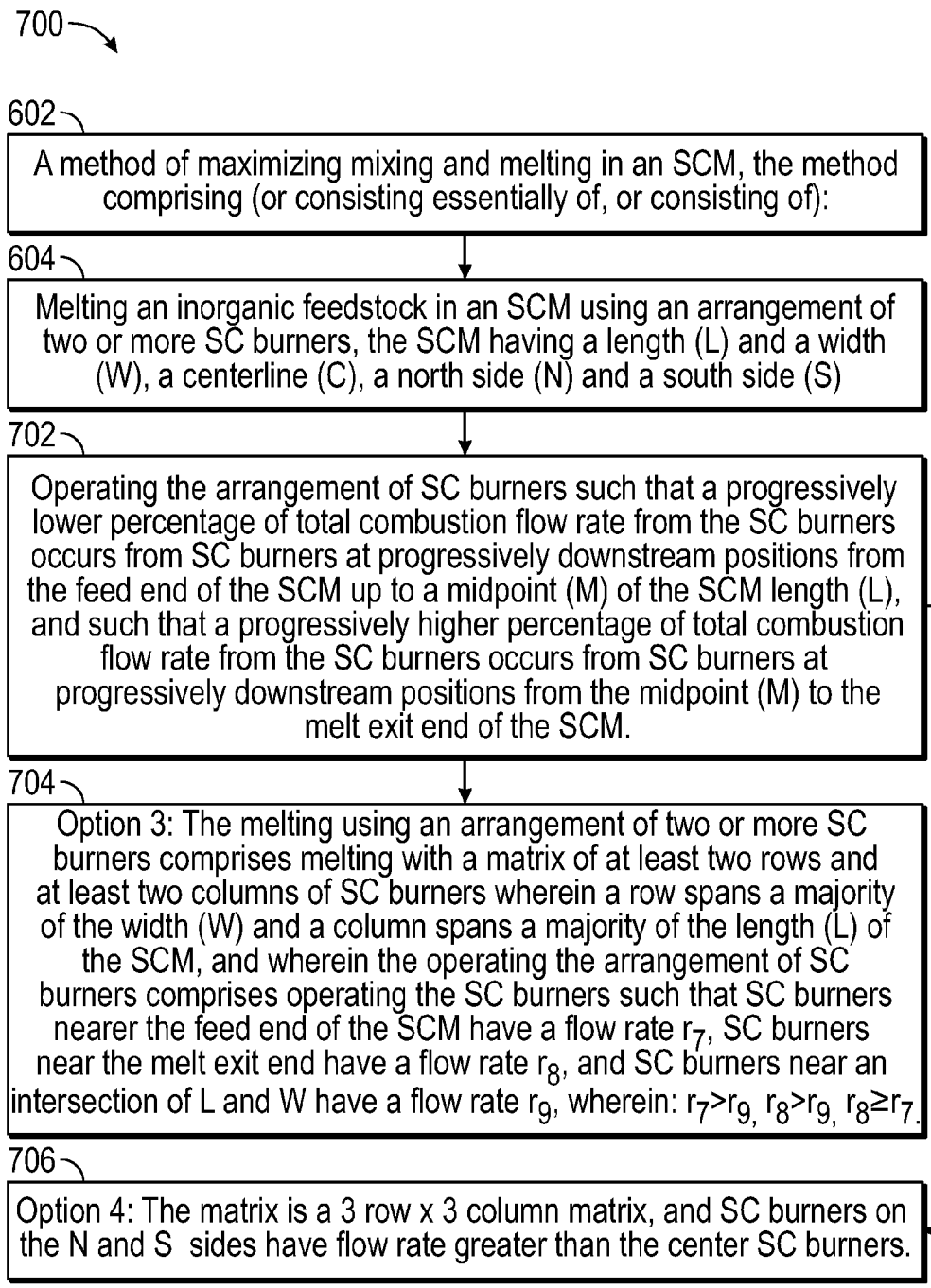

FIG. 8 illustrates a method 700, which has at least two variations or two sub-embodiments, both having the same two initial steps, and both intended to maximize both mixing and melting in the SCM. Box 602, a method maximizing mixing and melting in an SCM, the method comprising (or consisting essentially of, or consisting of):

(a) (box 604) melting an inorganic feedstock in an SCM using an arrangement of two or more SC burners, the SCM having a length (L) and a width (W), a centerline (C), a north side (N) and a south side (S);

(b) (box 702) operating the arrangement of SC burners such that a progressively lower percentage of total combustion flow rate from the SC burners occurs from SC burners at progressively downstream positions from the feed end of the SCM up to a midpoint (M) of the SCM length (L), and such that a progressively higher percentage of total combustion flow rate from the SC burners occurs from SC burners at progressively downstream positions from the midpoint (M) to the melt exit end of the SCM.

In sub-embodiment or option 3, (box 704), the melting using an arrangement of two or more SC burners comprises melting with a matrix of at least two rows and at least two columns of SC burners wherein a row spans a majority of the width (W) and a column spans a majority of the length (L) of the SCM, and wherein the operating the arrangement of SC burners comprises operating the SC burners such that SC burners nearer the feed end of the SCM have a flow rate $r_7$, SC burners near the melt exit end have a flow rate $r_8$, and SC burners near an intersection of L and a midpoint M have a flow rate $r_9$, wherein:

$r_7 > r_9$ $r_8 > r_9$, and $r_8 \geq r_7$.

In sub-embodiment or option 4, (box 706) the matrix is a 3 row×3 column matrix, and SC burners on the N and S sides have flow rate greater than the center SC burners.

Figure 9:
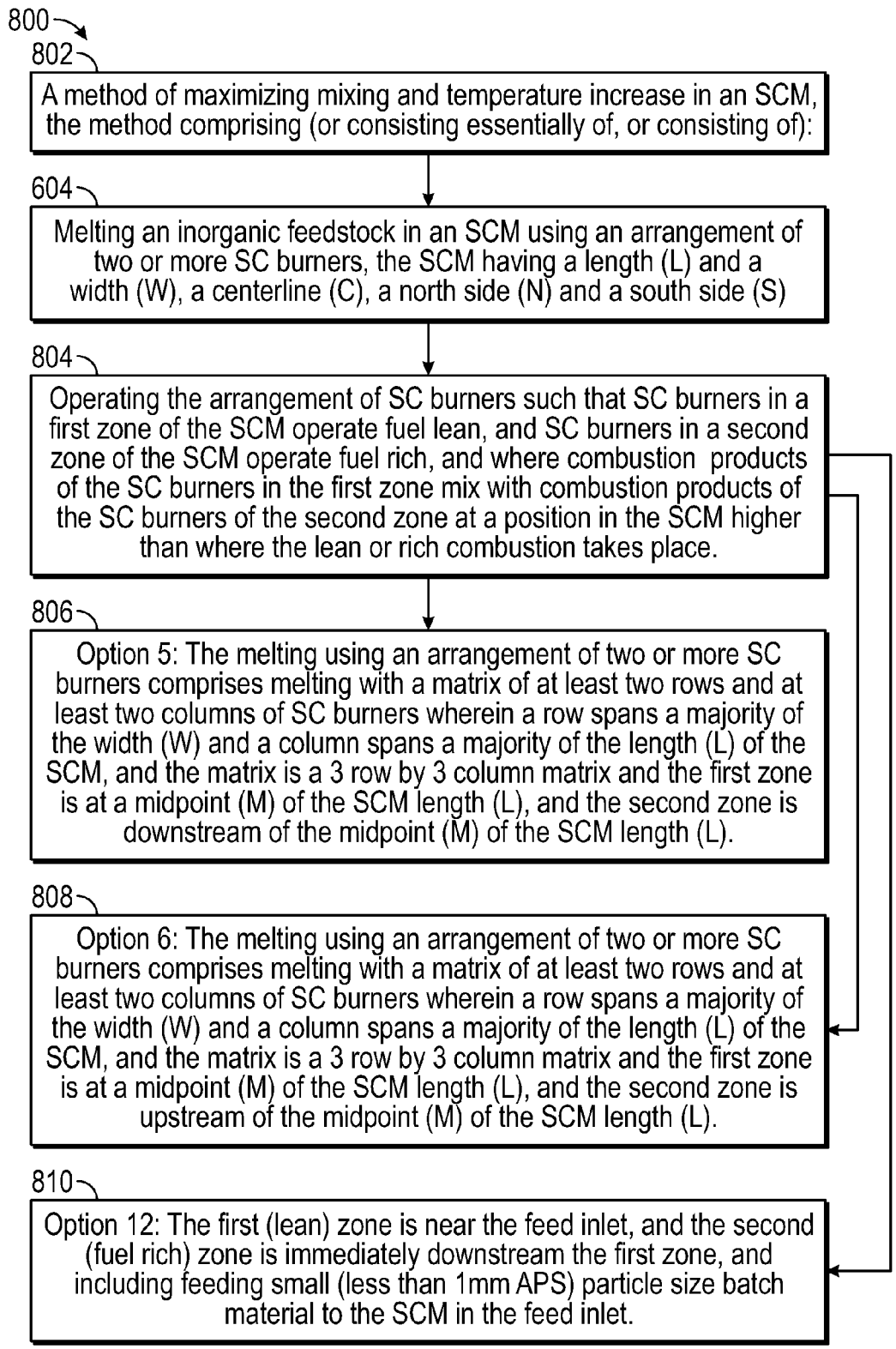

FIG. 9 illustrates a method 800, which has at least three variations or three sub-embodiments, each having the same two initial steps, and each intended to maximize both mixing and temperature increase in the SCM. Box 802, a method maximizing mixing and temperature increase in an SCM, the method comprising (or consisting essentially of, or consisting of):

(a) (box 604) melting an inorganic feedstock in an SCM using an arrangement of two or more SC burners, the SCM having a length (L) and a width (W), a centerline (C), a north side (N) and a south side (S); and (b) (box 804) operating the arrangement of SC burners such that SC burners in a first zone of the SCM operate fuel lean, and SC burners in a second zone of the SCM operate fuel rich, and where combustion products of the SC burners in the first zone mix with combustion products of the SC burners of the second zone at a position in the SCM higher than where the lean or rich combustion takes place.

In sub-embodiment or option 5, (box 806) the melting using an arrangement of two or more SC burners comprises melting with a matrix of at least two rows and at least two columns of SC burners wherein a row spans a majority of the width (W) and a column spans a majority of the length (L) of the SCM, and the matrix is a 3 row by 3 column matrix and the first zone is at a midpoint (M) of the SCM length (L), and the second zone is downstream of the midpoint (M) of the SCM length (L). In sub-embodiment or option 6, (box 808) the melting using an arrangement of two or more SC burners comprises melting with a matrix of at least two rows and at least two columns of SC burners wherein a row spans a majority of the width (W) and a column spans a majority of the length (L) of the SCM, and the matrix is a 3 row by 3 column matrix and the first zone is at a midpoint (M) of the SCM length (L), and the second zone is upstream of the midpoint (M) of the SCM length (L). In sub-embodiment or option 12, (box 810) the first (lean) zone is near the feed inlet, and the second (fuel rich) zone is immediately downstream the first zone, and including feeding small (less than 1 mm APS) particle size batch material to the SCM in the feed inlet.

Figure 10:
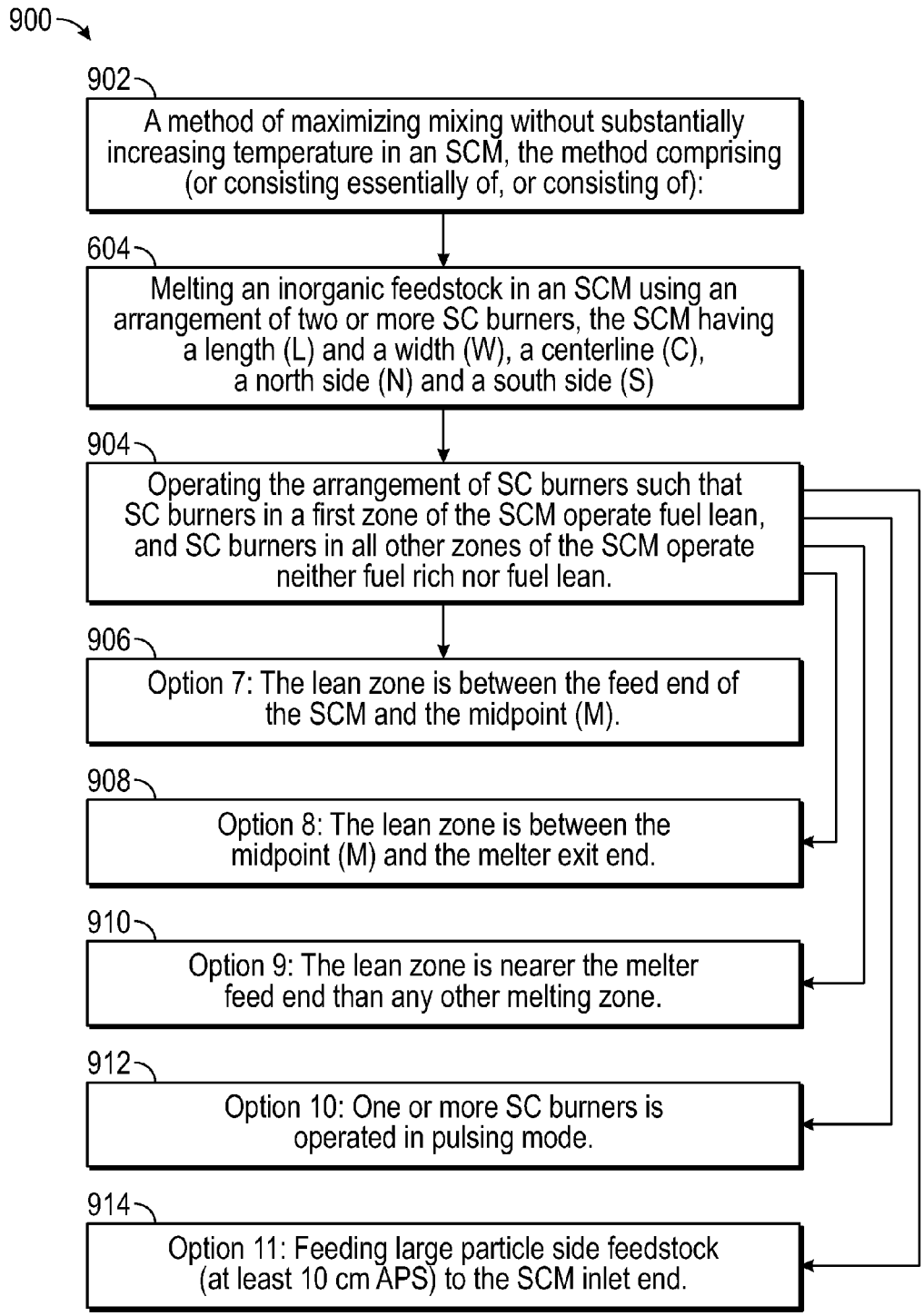

FIG. 10 illustrates a method 900, which has at least five variations or five sub-embodiments, each having the same two initial steps, and all intended to maximize mixing without substantially increasing temperature of the melt in the SCM. Box 902, a method maximizing mixing without substantially increasing temperature of melt in the SCM, the method comprising (or consisting essentially of, or consisting of):

(a) (box 604) melting an inorganic feedstock in an SCM using an arrangement of two or more SC burners, the SCM having a length (L) and a width (W), a centerline (C), a north side (N) and a south side (S); and (b) (box 904) operating the arrangement of SC burners such that SC burners in a first zone of the SCM operate fuel lean, and SC burners in all other zones of the SCM operate neither fuel rich nor fuel lean.

In sub-embodiment or option 7, (box 906) the lean zone is between the feed end of the SCM and the midpoint (M). In sub-embodiment or option 8, (box 908) the lean zone is between the midpoint (M) and the SCM exit end. In sub-embodiment or option 9, (box 910) the lean zone is nearer the melter feed end than any other melting zone. In sub-embodiment or option 10, (box 912) one or more SC burners is operated in pulsing mode. In sub-embodiment or option 11, (box 914) the feeding large particle size feedstock (at least 10 cm APS) to the SCM inlet end.

In operation, flow of feedstock into the SCM may be continuous, semi-continuous, semi-batch, or batch. For example, in certain embodiments feedstock could flow into a feedstock heat exchange substructure until the feedstock heat exchange substructure is partially full or completely full of feedstock, then the pre-heated feedstock may be dumped into the SCM. One way of accomplishing that may be by use of a grating at the bottom of a feedstock heat exchange substructure having openings slightly smaller than the feedstock particle size. Such an arrangement is disclosed in assignee's co-pending U.S. patent application Ser. No. 14/844,198, filed Sep. 3, 2015, incorporated by reference herein.

The initial raw material feedstock may include any material suitable for forming molten inorganic materials. In certain embodiments where the feedstock is pre-heated by melter exhaust, the feedstock may have a weight average particle size such that most if not all of the feedstock is not fluidized when traversing through the heat exchange structure or exhaust conduit serving as the heat exchange structure. Such materials may include glass precursors or other non-metallic inorganic materials, such as, for example, limestone, glass cullet, feldspar, basalt or other rock wool forming material, and mixtures thereof. Typical examples of basalt that are compositionally stable and available in large quantities are reported in the afore-mentioned U.S. Patent Publication 20120104306, namely an ore having a larger amount of $SiO_2$ (A, for high-temperature applications) and an ore having a smaller amount of $SiO_2$ (B, for intermediate-temperature applications), both of which have approximately the same amount of $Al_2O_3$. Although ore A can be spun into fiber, the resultant basalt fiber has heat-resistance problem at temperature ranges exceeding 750° C. Ore B, on the other hand, is associated with higher energy cost for mass production of fiber. The basalt rock material feedstock for use on the systems and methods of the present disclosure may be selected from: (1) high-temperature ore (A) having substantially the same amount of $Al_2O_3$ and a larger amount of $SiO_2$; (2) intermediate-temperature ore (B) having substantially the same amount of $Al_2O_3$ and a smaller amount of $SsO_2$; and (3) a mixture of the high-temperature basalt rock ore (A) and the intermediate-temperature basalt rock ore (B).

Basalt rock (basalt ore) is an igneous rock. According to U.S. Patent Publication 20120104306, major examples of the constituent mineral include: (1) plagioclase: $Na(AlSi_3O_8)$—$Ga(Al_2SiO_3)$; (2) pyroxene: $(Ca, Mg, Fe^{2+}, Fe^{3+}, Al, Ti)_2[(Si, Al)_2O_6]$; and (3) olivine: $(Fe, Mg)_2SiO_4$. Ukrainian products are inexpensive and good-quality.

Tables 1 and 2 (from U.S. Patent Publication 20120104306) show examples of element ratios (wt. %) and the oxide-equivalent composition ratios (wt. %) determined by ICP analysis (using an inductively-coupled plasma spectrometer ICPV-8100 by Shimadzu Corporation) performed on a high-temperature basalt ore (for high-temperature applications), an intermediate-temperature basalt ore (for intermediate-temperature applications), and a glass consisting of 85% high-temperature ore and 15% intermediate-temperature ore.

TABLE 1

| | Ore (for high-temp.) (wt %) | Ore (for intermediate-temp.) (wt %) | Ore (for high-temp.) 85 wt % Ore (for intermediate-temp.) 15 wt % (wt %) |
|---|---|---|---|
| Si | 23.5~28.8 | 23.5~28.5 | 25.0~28.8 |
| Al | 8.7~9.3 | 8.7~9.3 | 9.0~9.5 |
| Fe | 6.0~6.6 | 6.0~7.1 | 5.7~6.7 |
| Ca | 4.0~4.5 | 5.6~6.1 | 4.2~4.7 |
| Na | 2.1~2.3 | 1.8~2.0 | 2.0~2.3 |
| K | 1.4~1.8 | 1.2~1.5 | 1.4~1.9 |
| Mg | 0.1~1.6 | 1.4~3.0 | 1.5~1.7 |
| Ti | 0.4~0.6 | 0.5~0.7 | 0.4~0.6 |
| Mn | 0.1~0.2 | 0.1~0.2 | 0.1~0.2 |
| P | 0.05~0.10 | 0.05~0.09 | 0.07~0.10 |
| B | 0.02~0.08 | 0.01~0.06 | 0.03~0.10 |
| Ba | 0.03~0.05 | 0.03~0.05 | 0.09 |
| Sr | 0.02~0.04 | 0.02~0.04 | 0.02~0.05 |

TABLE 1-continued

| | Ore (for high-temp.) (wt %) | Ore (for intermediate-temp.) (wt %) | Ore (for high-temp.) 85 wt % Ore (for intermediate-temp.) 15 wt % (wt %) |
|---|---|---|---|
| Zr | 0.01~0.04 | 0.01~0.04 | 0.01~0.03 |
| Cr | 0.01~0.03 | 0.01~0.03 | 0.01~0.03 |
| S | 0.01~0.03 | 0.01~0.03 | 0.01~0.03 |

TABLE 2

| | Ore (for high-temp.) (wt %) | Ore (for intermediate-temp.) (wt %) | Ore (for high-temp.) 85 wt % Ore (for intermediate-temp.) 15 wt % (wt %) |
|---|---|---|---|
| $SiO_2$ | 57.1~61.2 | 54.0~58.2 | 57.7~60.6 |
| $Al_2O_3$ | 16.1~19.2 | 14.9~18.1 | 16.5~18.9 |
| $FeO + Fe_2O_3$ | 8.0~9.7 | 8.1~9.6 | 7.7~9.6 |
| CaO | 5.5~6.8 | 7.5~8.8 | 5.8~7.0 |
| $Na_2O$ | 2.8~3.3 | 2.2~2.9 | 2.6~3.2 |
| $K_2O$ | 1.8~2.1 | 1.4~1.8 | 1.8~2.2 |
| MgO | 0.20~2.5 | 1.4~4.8 | 0.2~2.8 |
| $TiO_2$ | 0.7~1.0 | 0.8~1.1 | 0.1~0.3 |
| MnO | 0.1~0.3 | 0.1~0.3 | 0.1~0.3 |
| $P_2O_5$ | 0.1~0.3 | 0.1~0.3 | 0.1~0.3 |
| $B_2O_3$ | 0.1~0.3 | 0.04~0.20 | 0.04~0.30 |
| BaO | 0.03~0.07 | 0.02~0.06 | 0.03~0.12 |
| SrO | 0.02~0.06 | 0.02~0.07 | 0.01~0.06 |
| $ZrO_2$ | 0.02~0.05 | 0.02~0.05 | 0.01~0.30 |
| $Cr_2O_3$ | 0.01~0.05 | 0.01~0.05 | 0.01~0.04 |
| SO | 0.01~0.03 | 0.01~0.03 | 0.01~0.03 |

In embodiments wherein glass batch is used as sole or as a supplemental feedstock, one glass composition for producing glass fibers is "E-glass," which typically includes 52-56% $SiO_2$, 12-16% $Al_2O_3$, 0-0.8% $Fe_2O_3$, 16-25% CaO, 0-6% MgO, 0-10% $B_2O_3$, 0-2% $Na_2O+K_2O$, 0-1.5% $TiO_2$ and 0-1% $F_2$. Other glass batch compositions may be used, such as those described in assignee's published U.S. application 20080276652.

As noted herein, submerged combustion burners and burner panels may produce violent turbulence of the molten inorganic material in the SCM and may result in sloshing of molten material, pulsing of combustion burners, popping of large bubbles above submerged burners, ejection of molten material from the melt against the walls and ceiling of melter, and the like. Frequently, one or more of these phenomena may result in undesirably short life of temperature sensors and other components used to monitor a submerged combustion melter's operation, making monitoring difficult, and use of signals from these sensors for melter control all but impossible for more than a limited time period. Processes and systems of the present disclosure may include indirect measurement of melt temperature in the melter itself, as disclosed in assignee's U.S. Pat. No. 9,096,453, using one or more thermocouples for monitoring and/or control of the melter, for example using a controller. A signal may be transmitted by wire or wirelessly from a thermocouple to a controller, which may control the melter by adjusting any number of parameters, for example feed rate of a feedstock feeder may be adjusted through a signal, and one or more of fuel and/or oxidant conduits may be adjusted via a signal, it being understood that suitable transmitters and actuators, such as valves and the like, are not illustrated for clarity.

Melter apparatus in accordance with the present disclosure may also comprise one or more wall-mounted submerged combustion burners, and/or one or more roof-mounted burners (not illustrated). Roof-mounted burners may be useful to pre-heat the melter apparatus melting zone, and serve as ignition sources for one or more submerged combustion burners and/or burner panels. Roof-mounted burners may be oxy-fuel burners, but as they are only used in certain situations, are more likely to be air/fuel burners. Most often they would be shut-off after pre-heating the melter and/or after starting one or more submerged combustion burners. In certain embodiments, if there is a possibility of carryover of batch particles to the exhaust, one or more roof-mounted burners could be used to form a curtain to prevent particulate carryover. In certain embodiments, all submerged combustion burners and burner panels may be oxy/fuel burners or oxy-fuel burner panels (where "oxy" means oxygen, or oxygen-enriched air, as described earlier), but this is not necessarily so in all embodiments; some or all of the submerged combustion burners or burner panels may be air/fuel burners. Furthermore, heating may be supplemented by electrical (Joule) heating in certain embodiments, in certain melter zones.

Certain system embodiment may comprise burner panels as described in assignee's co-pending U.S. patent application Ser. No. 14/838,148, filed Aug. 27, 2015, comprising a burner panel body and one or more sets of concentric conduits for flow of oxidant and fuel. Certain burner panels disclosed therein include those wherein the outer conduit of at least some of the sets of concentric conduits are oxidant conduits, and the at least one inner conduit is one or more fuel conduits. Certain burner panel embodiments may comprise non-fluid cooled or fluid-cooled protective members comprising one or more noble metals. Certain burner panel embodiments may comprise non-fluid cooled or fluid-cooled protective members consisting essentially of one or more noble metals. Certain burner panel embodiments may comprise non-fluid cooled or fluid-cooled protective members consisting of one or more noble metals. Certain burner panel embodiments may comprise those wherein the lower fluid-cooled portion and the upper non-fluid cooled portion are positioned in layers, with the lower fluid-cooled portion supporting the sets of conduits and the associated protective members. Certain burner panel embodiments may comprise those wherein the non-fluid cooled protective member is a shaped annular disk having a through passage, the through passage of the shaped annular disk having an internal diameter substantially equal to but not larger than an internal diameter of the outer conduit. Certain burner panel embodiments may comprise those wherein an internal surface of the through passage of the shaped annular disk and a portion of a top surface of the shaped annular disk are not engulfed by the fluid-cooled or non-fluid-cooled portions of the panel body. Certain combustion burner panels may comprise a panel body having a first major surface defined by a lower fluid-cooled portion of the panel body, and a second major surface defined by an upper non-fluid cooled portion of the panel body, the panel body having at least one through passage extending from the first to the second major surface, the through passage diameter being greater in the lower fluid-cooled portion than in the upper non-fluid cooled portion, the panel body supporting at least one set of substantially concentric at least one inner conduit and an outer conduit, each conduit comprising proximal and distal ends, the at least one inner conduit forming a primary passage and the outer conduit forming a secondary passage between the outer conduit and the at least one inner conduit; and (b) a fluid-cooled protective member associated with each set and having connections for coolant fluid supply and return, each fluid-cooled protective member positioned adjacent at least a portion of the circumference of the outer conduit between the proximal and distal ends thereof at approximately a position of the fluid-cooled portion of the panel body. Certain burner panel embodiments may comprise those wherein each fluid-cooled protective member is a fluid-cooled collar having an internal diameter about the same as an external diameter of the outer conduit, the fluid-cooled collar having an external diameter larger than the internal diameter. Certain burner panel embodiments may comprise a mounting sleeve. In certain burner panel embodiments the mounting sleeve having a diameter at least sufficient to accommodate the external diameter of the fluid-cooled collar. In certain embodiments, the burner panel may include only one or more fuel conduits, or only one or more oxidant conduits. These embodiments may be paired with other panels supplying fuel or oxidant (as the case might be), the pair resulting in combustion of the fuel from one panel with the oxidant from the other panel. In certain embodiments the burner panel may comprise a pre-disposed layer or layers of glass, ceramic, refractory, and/or refractory metal or other protective material as a protective skull over the non-fluid cooled body portion or layer. The layer or layers of protective material may or may not be the same as the material to be melted in the SCM.

Suitable materials for glass-contact refractory, which may be present in SCMs, burners, and burner panels useful herein, include AZS (alumina-zirconia-silica), α/β alumina, zirconium oxide, chromium oxide, chrome corundum, so-called "dense chrome", and the like. One "dense chrome" material is available from Saint Gobain under the trade name SEFPRO, such as C1215 and C1221. Other useable "dense chrome" materials are available from the North American Refractories Co., Cleveland, Ohio (U.S.A.) under the trade designations SERV 50 and SERV 95. Other suitable materials for components that require resistance to high temperatures are fused zirconia ($ZrO_2$), fused cast AZS (alumina-zirconia-silica), rebonded AZS, or fused cast alumina ($Al_2O_3$). The choice of a particular material may be dictated by the geometry of the apparatus, the type of material being produced, operating temperature, burner body panel geometry, and type of glass or other product being produced.

The term "fluid-cooled" means use of any coolant fluid (heat transfer fluid) to transfer heat away from the equipment in question, other than ambient air that resides naturally on the outside of the equipment. For example, portions of or the entire panels of sidewall structure, floor, and roof of the SCM, portions or all of heat transfer substructures used to preheat feedstock (for example nearest the melter), portions of feedstock supply conduits, and portions of SC burners, and the like may require fluid cooling. Heat transfer fluids may be any gaseous, liquid, slurry, or some combination of gaseous, liquid, and slurry compositions that functions or is capable of being modified to function as a heat transfer fluid. Gaseous heat transfer fluids may be selected from air, including ambient air and treated air (for example, air treated to remove moisture), inorganic gases, such as nitrogen, argon, and helium, organic gases such as fluoro-, chloro- and chlorofluorocarbons, including perfluorinated versions, such as tetrafluoromethane, and hexafluoroethane, and tetrafluoroethylene, and the like, and mixtures of inert gases with small portions of non-inert gases, such as hydrogen. Heat transfer liquids and slurries may be selected from liquids and slurries that may be organic, inorganic, or some combination thereof, for example, water, salt solutions, glycol solutions, oils and the like. Other possible heat transfer fluids include steam (if cooler than the expected glass melt temperature), carbon dioxide, or mixtures thereof with nitrogen. Heat transfer fluids may be compositions comprising both gas and liquid phases, such as the higher chlorofluorocarbons. Certain SCMs and method embodiments of this disclosure may include fluid-cooled panels such as disclosed in assignee's U.S. Pat. No. 8,769,992.

Certain systems and processes of the present disclosure may utilize measurement and control schemes such as described in Applicant's U.S. Pat. No. 9,096,453, and/or feed batch densification systems and methods as described in assignee's U.S. Pat. No. 9,643,869. Certain SCMs and processes of the present disclosure may utilize devices for delivery of treating compositions such as disclosed in assignee's U.S. Pat. No. 8,973,405.

Certain systems, apparatus, and method embodiments of this disclosure may be controlled by one or more controllers. For example, combustion (flame) temperature may be controlled by monitoring one or more parameters selected from velocity of the fuel, velocity of the primary oxidant, mass and/or volume flow rate of the fuel, mass and/or volume flow rate of the primary oxidant, energy content of the fuel, temperature of the fuel as it enters burners or burner panels, temperature of the primary oxidant as it enters burners or burner panels, temperature of the effluent (exhaust) at melter exhaust exit, pressure of the primary oxidant entering burners or burner panels, humidity of the oxidant, burner or burner panel geometry, combustion ratio, and combinations thereof. Certain SCMs and processes of this disclosure may also measure and/or monitor feed rate of batch or other feedstock materials, such as rock wool or mineral wool feedstock, glass batch, cullet, mat or wound roving and treatment compositions, mass of feed, and use these measurements for control purposes. Flow diverter positions may be adjusted or controlled to increase heat transfer in heat transfer substructures and exhaust conduits.

Various conduits, such as feedstock supply conduits, exhaust conduits, oxidant and fuel conduits of burners or burner panels of the present disclosure may be comprised of metal, ceramic, ceramic-lined metal, or combination thereof. Suitable metals include carbon steels, stainless steels, for example, but not limited to, 306 and 316 steel, as well as titanium alloys, aluminum alloys, and the like. High-strength materials like C-110 and C-125 metallurgies that are NACE qualified may be employed for burner body components. (As used herein, "NACE" refers to the corrosion prevention organization formerly known as the National Association of Corrosion Engineers, now operating under the name NACE International, Houston, Tex.) Use of high strength steel and other high strength materials may significantly reduce the conduit wall thickness required, reducing weight of the conduits and/or space required for conduits. In certain locations, precious metals and/or noble metals (or alloys) may be used for portions or all of these conduits. Noble metals and/or other exotic corrosion and/or fatigue-resistant materials such as platinum (Pt), ruthenium (Ru), rhodium (Rh), palladium (Pd), silver (Ag), osmium (Os), iridium (Ir), and gold (Au); alloys of two or more noble metals; and alloys of one or more noble metals with a base metal may be employed. In certain embodiments a protective layer or layers or components may comprise an 80 wt. percent platinum/20 wt. percent rhodium alloy attached to a base metal using brazing, welding or soldering of certain regions, as further explained in assignee's published application WO2014189504.

The choice of a particular material is dictated among other parameters by the chemistry, pressure, and temperature of fuel and oxidant used and type of melt to be produced with certain feedstocks. The skilled artisan, having knowledge of the particular application, pressures, temperatures, and available materials, will be able design the most cost effective, safe, and operable heat transfer substructures, feedstock and exhaust conduits, burners, burner panels, and melters for each particular application without undue experimentation.

The total quantities of fuel and oxidant used by burners or burner panels of the present disclosure may be such that the flow of oxygen may range from about 0.9 to about 1.2 of the theoretical stoichiometric flow of oxygen necessary to obtain the complete combustion of the fuel flow. Another expression of this statement is that the combustion ratio may range from about 0.9 to about 1.2. The amount of heat needed to be produced by combustion of fuel in the melter (and/or Joule heating) will depend upon the efficiency of the preheating of the feedstock in the feedstock heat exchange substructure. The larger the amount of heat transferred to the feedstock, the lower the heat energy required in the melter from the fuel and/or Joule elements. When operating "lean", the combustion ratio is above about 1.0, or above about 1.5, or above about 2.0, or above about 2.5. When operating "rich", the combustion ratio is below about 1.0, or below about 0.9, or below about 0.8, or below about 0.7, or below about 0.6, or below about 0.5, or below about 0.2.

In SCMs, the velocity of the fuel in the various burners and/or burner panel embodiments depends on the burner/burner panel geometry used, but generally is at least about 15 meters/second (m/s). The upper limit of fuel velocity depends primarily on the desired penetration of flame and/or combustion products into the glass melt and the geometry of the burner panel; if the fuel velocity is too low, the flame temperature may be too low, providing inadequate temperature in the melter, which is not desired, and if the fuel flow is too high, flame and/or combustion products might impinge on a melter wall or roof, or cause carryover of melt into the exhaust, or be wasted, which is also not desired. Baffles may be provided extending from the roof, and/or in the melter exhaust conduit, such as in the heat exchange substructure, in order to safeguard against this. Similarly, oxidant velocity should be monitored so that flame and/or combustion products do not impinge on an SCM wall or roof, or cause carryover of melt into the exhaust, or be wasted. Oxidant velocities depend on fuel flow rate and fuel velocity, but in general should not exceed about 200 ft/sec at 400 scfh flow rate.

Although only a few exemplary embodiments of this disclosure have been described in detail above, those skilled in the art will readily appreciate that many modifications are possible in the exemplary embodiments without materially departing from the novel teachings and advantages of this disclosure. Accordingly, all such modifications are intended to be included within the scope of this disclosure as defined in the following claims. In the claims, no clauses are intended to be in the means-plus-function format allowed by 35 U.S.C. § 112, Section F, unless "means for" is explicitly recited together with an associated function. "Means for" clauses are intended to cover the structures, materials, and/or acts described herein as performing the recited function and not only structural equivalents, but also equivalent structures.

What is claimed is:

1. A method of maximizing mixing and melting in a submerged combustion melter (SCM), the method comprising:
    (a) melting an inorganic feedstock in the SCM, the SCM having a length (L) and a width (W), a centerline (C), a north side (N) and a south side (S), using a matrix of at least two rows and at least two columns of submerged combustion (SC) burners wherein a row spans a majority of the width (W) and a column spans a majority of the length (L) of the SCM;

(b) operating the matrix of SC burners such that a progressively higher percentage of a total combustion flow rate from the SC burners occurs from SC burners at progressively downstream positions; and (c) the SC burners on the N and S sides in a first row R1 operate at a rate $r_3$, and the SC burners in the center (C) of the first row R1 operate at a rate $r_4$, where $r_3 > r_4$, and the SC burners on N and S sides in a second row R2 operate at a rate $r_5$ and the SC burners in the center (C) of the second row R2 operate at a rate $r_6$, where $r_5 > r_6 \geq r_4$ and $r_5 > r_3$, wherein $r_3$, $r_4$, $r_5$, and $r_6$ are combustion flow rates.

2. A method of maximizing mixing and melting in a submerged combustion melter (SCM), the method comprising:

(a) melting an inorganic feedstock in the SCM, the SCM having a length (L) and a width (W), a centerline (C), a north side (N) and a south side (S), using a matrix of at least two rows and at least two columns of submerged combustion (SC) burners wherein a row spans a majority of the width (W) and a column spans a majority of the length (L) of the SCM;

(b) operating all SC burners for a first time period with equal percentage of the total combustion flow rate, adding a first amount at a first concentration of a tracer compound or element to the inorganic feedstock at a beginning of the first time period, measuring concentration of the tracer compound or element in melt exiting the SCM during the first time period;

(c) after the first time period, operating all SC burners for a second time period equal to the first time period, adding a second amount equal to the first amount at the first concentration of the tracer compound or element to the inorganic feedstock at a beginning of the second time period, then measuring concentration of the tracer compound or element in melt exiting the SCM during the second time period to verify a decrease in the tracer compound or element concentration in the melt exiting the SCM at the end of the second time period indicating an increase in residence time of melt in the SCM during the second time period compared to the tracer compound or element concentration at the end of the first time period and residence time of the melt exiting the SCM at the end of the first time period when all SC burners were operating with equal percentage of the total combustion flow rate, operating the SC burners on the N and S sides in a first row R1 at a rate $r_3$ during the second time period, operating the SC burners in the center (C) of the first row R1 at a rate $r_4$ during the second time period, where $r_3 > r_4$, operating the SC burners on N and S sides in a second row R2 at a rate $r_5$ during the second time period, and operating the SC burners in the center (C) of the second row R2 at a rate $r_6$ during the second time period, where $r_5 > r_6 \geq r_4$, and $r_5 > r_3$, wherein $r_3$, $r_4$, $r_5$, and $r_6$ are combustion flow rates.

3. The method in accordance with claim 2 wherein the tracer compound or element is selected from the group consisting of ZnO (zinc oxide), $SrCO_3$ (strontium carbonate), $BaCO_3$ (barium carbonate), and $Li_2CO_3$ (lithium carbonate), and mixtures and combinations thereof.

* * * * *